(12) United States Patent  (10) Patent No.: US 8,533,043 B2
Ratnaparkhi et al.  (45) Date of Patent: Sep. 10, 2013

(54) CLICKABLE TERMS FOR CONTEXTUAL ADVERTISING

(75) Inventors: Adwait Ratnaparkhi, San Jose, CA (US); Abraham Bagherjeiran, Sunnyvale, CA (US); Andrew O. Hatch, Oakland, CA (US)

(73) Assignee: Yahoo! Inc., Sunnyvale, CA (US)

( * ) Notice: Subject to any disclaimer, the term of this patent is extended or adjusted under 35 U.S.C. 154(b) by 471 days.

(21) Appl. No.: 12/751,937

(22) Filed: Mar. 31, 2010

(65) Prior Publication Data

US 2011/0246285 A1 Oct. 6, 2011

(51) Int. Cl.
*G06Q 30/00* (2012.01)
(52) U.S. Cl.
USPC .............. 705/14.43; 705/14.42; 705/14.4
(58) Field of Classification Search
USPC .............................. 705/14.6, 14.42
See application file for complete search history.

(56) References Cited

U.S. PATENT DOCUMENTS

| 6,665,653 | B1 * | 12/2003 | Heckerman et al. ........... 706/47 |
| 2003/0229531 | A1 * | 12/2003 | Heckerman et al. ........... 705/10 |
| 2006/0195440 | A1 * | 8/2006 | Burges et al. ..................... 707/5 |

OTHER PUBLICATIONS

Shawatni et al., "Statistical Techniques for Online Personalized Advertising: A Survey", 27th Symposium on Applied Computing, Association for Computing Machinery, Rive del Garda, Italy, 2012, pp. 680-687.*

* cited by examiner

*Primary Examiner* — John G Weiss
*Assistant Examiner* — Scott C Anderson
(74) *Attorney, Agent, or Firm* — Brinks Hofer Gilson & Lione

(57) ABSTRACT

An online advertising selects online advertisements for display on a network location taking into account a probability that a candidate online advertisement will receive a click on a particular website. The system may determine a network location identity of the network location and transform a set of advertisements into a set of ranked advertisements. The system may determine an advertisement rank of a first advertisement among the set of ranked advertisements. The system then may generate a click probability value. The click probability value may reflect a click probability of the first advertisement by dividing an exponent of a weighted sum of the network location identity and the advertisement rank by one plus the exponent of the weighted sum of the network location identity and the advertisement rank.

17 Claims, 5 Drawing Sheets

CLICKABLE TERMS FOR CONTEXTUAL ADVERTISING

BACKGROUND

1. Field

The information disclosed relates to online advertising. More particularly, the information disclosed relates to estimating a probability that a candidate online advertisement will receive a click on a particular website.

2. Background Information

The marketing of products and services online over the Internet through advertisements is big business. In February 2008, the IAB Internet Advertising Revenue Report conducted by PricewaterhouseCoopers announced that PricewaterhouseCoopers anticipated the Internet advertising revenues for 2007 to exceed US$21 billion. With 2007 revenues increasing 25 percent over the previous 2006 revenue record of nearly US$16.9 billion, Internet advertising presently is experiencing unabated growth.

Unlike print and television advertisement that primarily seeks to reach a target audience, Internet advertising seeks to reach target individuals. The individuals need not be in a particular geographic location and Internet advertisers may elicit responses and receive instant responses from individuals. As a result, Internet advertising is a much more cost effective channel in which to advertise.

Contextual advertising is the task of displaying ads on webpages based on the content displayed to the user. Much of the contextual advertising market is based on a pay-per-click (PPC) model, where the advertiser pays the web publisher a fee every time a user clicks on an ad. The amount of revenue that a publisher collects per page view is a function of the click-through-rate (CTR) of each ad, along with the cost that the advertiser agrees to pay per click (note that this cost can itself be a function of various factors). Contextual advertising revenue is highly dependent on which ads the publisher chooses to display since CTR and cost-per-click can vary significantly from one ad to the next. Many publishers use commercial intermediaries known as ad networks to dynamically optimize the selection of ads for web pages based on various attributes of the page, ad, and user. The ad network space is composed of several large players (e.g., Yahoo!™, Microsoft™, and Google™), along with many smaller companies.

A goal is to display ads that are relevant to the user, in the context of the page, so that the user clicks on the ad thereby generating revenue for the webpage owner and the advertising network. Under a click model, advertising systems estimate a probability that a candidate-for-display advertisement will receive a click. While typical click model approaches have use when the candidate advertisement is for a webpage rich with words and phrases, they tend to be of limited use where ad relevance cannot easily be gleaned from the webpage text alone, such as for webpages that have limited or no content, or where the content is not product-related. There is a need to address these and other issues.

SUMMARY

An online advertising selects online advertisements for display on a network location taking into account a probability that a candidate online advertisement will receive a click on a particular Website. The system may determine a network location identity of the network location, and transform a set of advertisements into a set of ranked advertisements. The system may determine an advertisement rank of a first advertisement among the set of ranked advertisements. The system then may generate a click probability value. The click probability value may reflect a click probability of the first advertisement by dividing an exponent of a weighted sum of the network location identity and the advertisement rank by one plus the exponent of the weighted sum of the network location identity and the advertisement rank.

DETAILED DESCRIPTION

Figure 1:
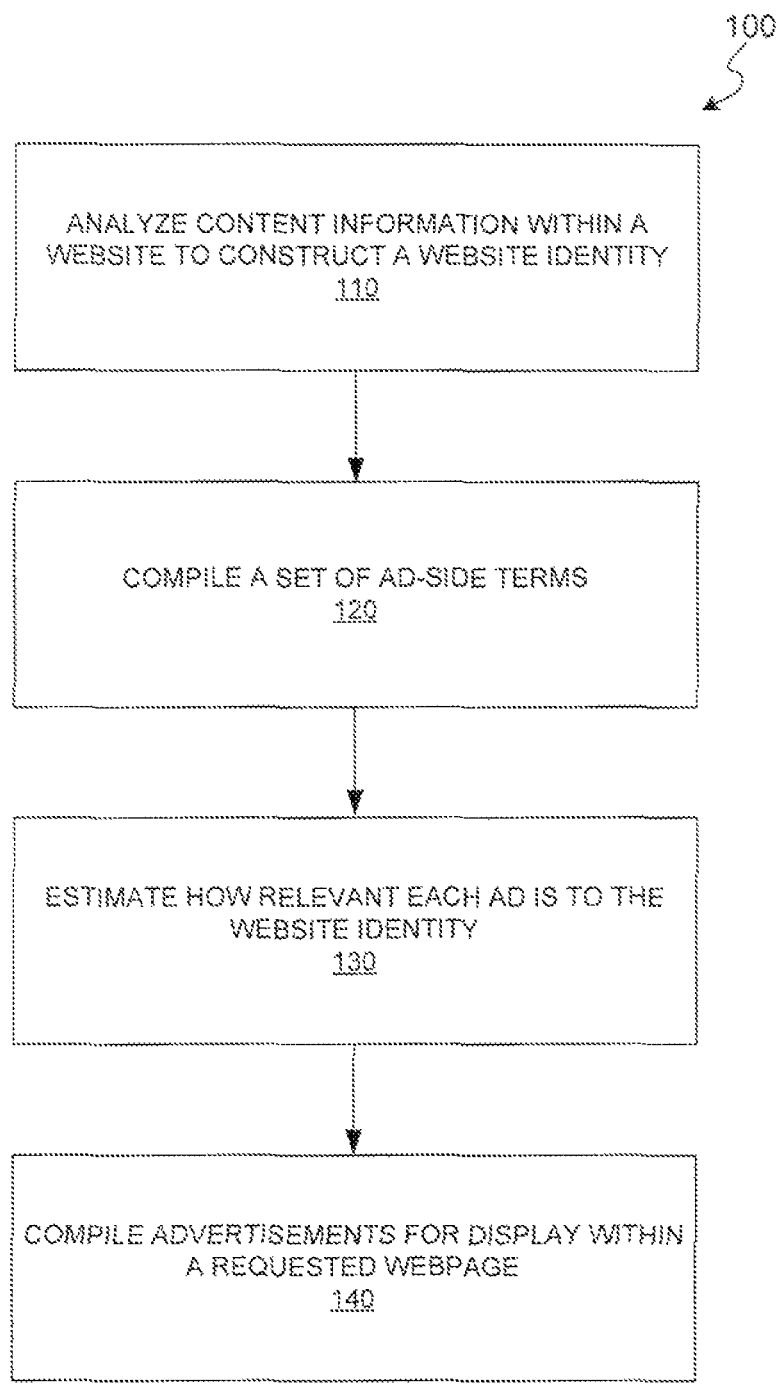
FIG. 1 is a flow diagram illustrating a contextual advertising method 100 implemented in a computer to select online advertisements for display on a network location.

The following describes an online advertising method that may be implemented in a computer to estimate a probability that a candidate online advertisement will receive a click on a particular website. Under this technique to determine a click probability of an advertisement impression that is for display on a network location, ad-side words and phrases (i.e., terms) automatically may be matched directly with specific websites. Typical click models are limited to using some measure of lexical match as a signal for estimating click probabilities. For example, typical click models may look to an intersection of words and phrases between a candidate ad and a webpage to estimate click probabilities. By comparison, the below "clickable terms" approach to contextual advertising may be used where ad relevance cannot be gleaned easily from the page text alone (e.g., pages that have limited or no content, or where the content is not product-related). The technology presented below solves a problem of how to measure click probability for online ads on a given website based primarily on the text of the advertisement.

Contextual advertising or content matching (CM) refers to a task of automatically matching webpages with contextually-relevant online advertisements. Advertisements displayed within a website on a webpage should have relevance to the user's interest to avoid degrading the user's experience and to increase the probability of a click reaction. In this regard, a goal is to display ads that are relevant to the user to enhance the user's experience and to receive a click on the ad to generate revenue for the webpage owner and the advertising network (e.g., Yahoo!™). A collective of the multiple webpages of the website itself may provide clues to the user's interest and typically is more informative and feature-rich than any single webpage within the site. Thus, the disclosed clickable terms approach uses textual content from the advertisement along with an identity of the website to measure probability-of-click before displaying an ad on a webpage.

Certain websites attract users with a particular, known set of interests. For example, autos.yahoo.com is a site about cars, and it tends to attract people who are interested in cars. Thus, click-relevant information about the webpage and user may be captured via the identity of the website itself for certain websites, independent of the words that appear or do not on a given webpage. The system implementing the below methods may analyze each candidate advertisement for a webpage in the broader context of the website to which the page belongs. This approach involves matching a website identity (e.g., autos.yahoo.com) directly with a set of ad-side terms, independent of the webpage content. Unlike most other ad-matching technologies, this technology does not require the collection of historical click data for a particular advertisement. Importantly, this approach can be used to match webpages with online textual advertisements.

The clickable terms approach uses the relative clickability of ad-side terms on a given website to form a new set of features to train a maximum-entropy (ME) click model. By using site- or domain-level information to match candidate advertisements, the clickable terms method would not only provide page users with a more enriched online experience, but likely result in increased advertisement click-through rates to ultimately increase pay-per-click advertisement revenue for the webpage owner and the advertising network. The synergistic effects of the methods leads to consistent and significant improvements in retrieved advertisement quality and gains in click-through-rate (CTR) over a lexical-only match approach as confirmed by experiments.

In the following description, numerous details are set forth for the purpose of explanation. However, one of ordinary skill in the art will realize that a skilled person may practice the methods without the use of the specific details. In other instances, the disclosure may show well-known structures and devices in block diagram form to prevent unnecessary details from obscuring the written description.

In the examples described below, users may access an entity, such as, for example, a content service-provider, over a network such as the Internet and further input various data. The system subsequently may capture this various data by selective processing modules within the network-based entity. The user input typically comprises "events." In one example, an event may be a type of action initiated by the user, typically through a conventional mouse click command. Events include, for example, advertisement clicks, search queries, search clicks, sponsored listing clicks, webpage views, and advertisement views. However, events, as used herein, may include any type of online navigational interaction or search-related events.

Each of such events initiated by a user may trigger a transfer of content information to the user. The user may see the displayed content information typically in the form of a webpage on the user's client computer. The webpage may incorporate content provided by publishers, where the content may include, for example, articles, and/or other data of interest to users displayed in a variety of formats. In addition, the webpage also may incorporate advertisements provided on behalf of various advertisers over the network by an advertising agency, where the advertising agency may be included within the entity, or in an alternative, the system may link the entity, the advertisers, and the advertising agency, for example.

The event of a user viewing a given webpage is referred to as an "impression" of that webpage and the event of viewing an ad is referred to as an impression of that ad. For every impression of a given webpage, an advertising network system may retrieve a set of candidate ads. The system then may select candidate ads to maximize the degree to which various terms and features in the ad match the given webpage or, as detailed below, the website identity.

With the candidate ads selected, the system may apply a click model to estimate the click probability for each ad. The click probability for each ad may be used as part of an expected cost per impression equation. Here, the expected cost per impression may equal a bid amount from the advertiser multiplied by the click probability of an ad impression:

$$\text{Expected cost per impression} = b(a) \cdot Pr(c(a)). \qquad (1)$$

where
  a represents a particular ad impression, which implicitly may specify not only the ad that was shown, but also the webpage identity, the time/date, and any other information associated with the impression,
  b(a) represents an advertiser's bid, which is a maximum cost-per-click of ad impression a,
  c(a) represents a click on ad impression a, and
  Pr(c(a)) represents a click probability of ad impression a.

Once the expected cost per impression of each ad is computed, the system then may rank the ads according to their expected cost per impression to produce an expected cost per impression list $a_1, a_2, \ldots, a_N$, where $a_1$ has a highest expected cost per impression and $a_N$ has a lowest expected cost per impression. From the expected cost per impression list, the system may return a top M number of ads to be displayed on the given webpage.

As noted above, a webpage may incorporate content provided by publishers, where the content may include, for example, articles, and/or other data of interest to users displayed in a variety of formats. The webpage also may incorporate advertising slates, where one advertising slate refers to a particular group of ads on a webpage. In this regard, it is the publisher who may determine the M number and M typically may equal three or four ads per advertising slate. After the advertisements appear on a webpage, the system may compute an actual cost for a click on ad impression $a_n$ through a 2nd-price auction on a bid amount from the advertiser multiplied by a ratio of click probabilities of two adjacently ordered ad impressions:

$$\text{cost}_i a_i n - 1 = b(a_i(n+1)) \cdot (Pr(c(a_i(n+1))))/(Pr(c(a_i n))) \qquad (2)$$

where
  $a_n$ represents ad impression a identified as n ad impression,
  $b(a_{n+1})$ represents an advertiser's bid for the ad impression after n ad impression,
  $c(a_n)$ represents a click on ad impression $a_n$,
  cost $(a_n)$ represents the actual cost for a click on ad $a_n$, and
  $Pr(c(a_n))$ represents a click probability of ad impression $a_n$.

Advertisement Selection

FIG. 1 is a flow diagram illustrating a contextual advertising method 100 implemented in a computer to select online advertisements for display on a network location. The online advertisements may be short textual ads typically having a headline and two to three lines of text below the headline. The network location may be a webpage of a website having a website identity. Method 100 may match the website identity directly with a set of ad-side terms, independent of the content of the webpage. Method 100 may be implemented in a pay-per-click content match (CM) system.

Method 100 may start at processing block 110. At processing block 110, method 100 may analyze content information within a website containing a webpage requested by a user to construct a website identity. Certain websites attract users with a particular, known set of interests. For example, autos.yahoo.com is a site about cars, and it tends to attract people who are interested in cars. Thus, for certain sites, click-relevant information about the webpage and user may be captured by the identity of the website itself, independent of the words that appear on the webpage. In this case, the website identity may implicitly reflect the website content information.

The website identity may be characterized by phrases that have a high propensity for clicks on the website. For example, assume that the system determines that the phrase "golf lessons" has a high propensity for clicks on the sports.yahoo.com website. The system may use this clickable term to match advertisements that contain the phrase "golf lessons" with webpages on sports.yahoo.com/tennis, which is not necessarily about golf. The same ads also can be matched with webpages on the website that contain little or no text at all.

At processing block 120, method 100 may compile a set of ad-side terms. The ad-side terms may reflect various terms and features in candidate advertisements. In compiling the set of ad side terms, method 100 may rank each ad rank and assign a value to the position of each ad within a given list or slate of contextual ads. For example, the advertisement that appears in a top ad position in a given slate of ads may receive a rank value of one.

At processing block 130, method 100 may estimate how relevant each ad is to the website identity. For example, method 100 may utilize the website identity and ad-side terms from a candidate online advertisement to estimate a probability that the candidate online advertisement will receive a click on a particular website. Finally, at processing block 140, method 100 may compile a set of advertisements to be displayed within the requested webpage. Here, method 100 may utilize the estimated probabilities to select advertisements that may maximize the degree to which various terms and features in the ad match the website identity.

Once the advertisements are selected for online display, the system may send advertising information to the user entity who requested the webpage. The advertising information may include multiple advertisements, which may include a hyperlink, such as, for example, a sponsor link, an integrated link, an inside link, or other known link. The format of an advertisement may or may not be similar to the format of the content displayed on the webpage and may include, for example, text advertisements, graphics advertisements, rich media advertisements, and other known types of advertisements. Alternatively, the system may transmit the advertisements to the publisher, which may assemble the webpage content and the advertisements for display on a client machine coupled to a user entity.

System for Advertisement Selection

Figure 2:
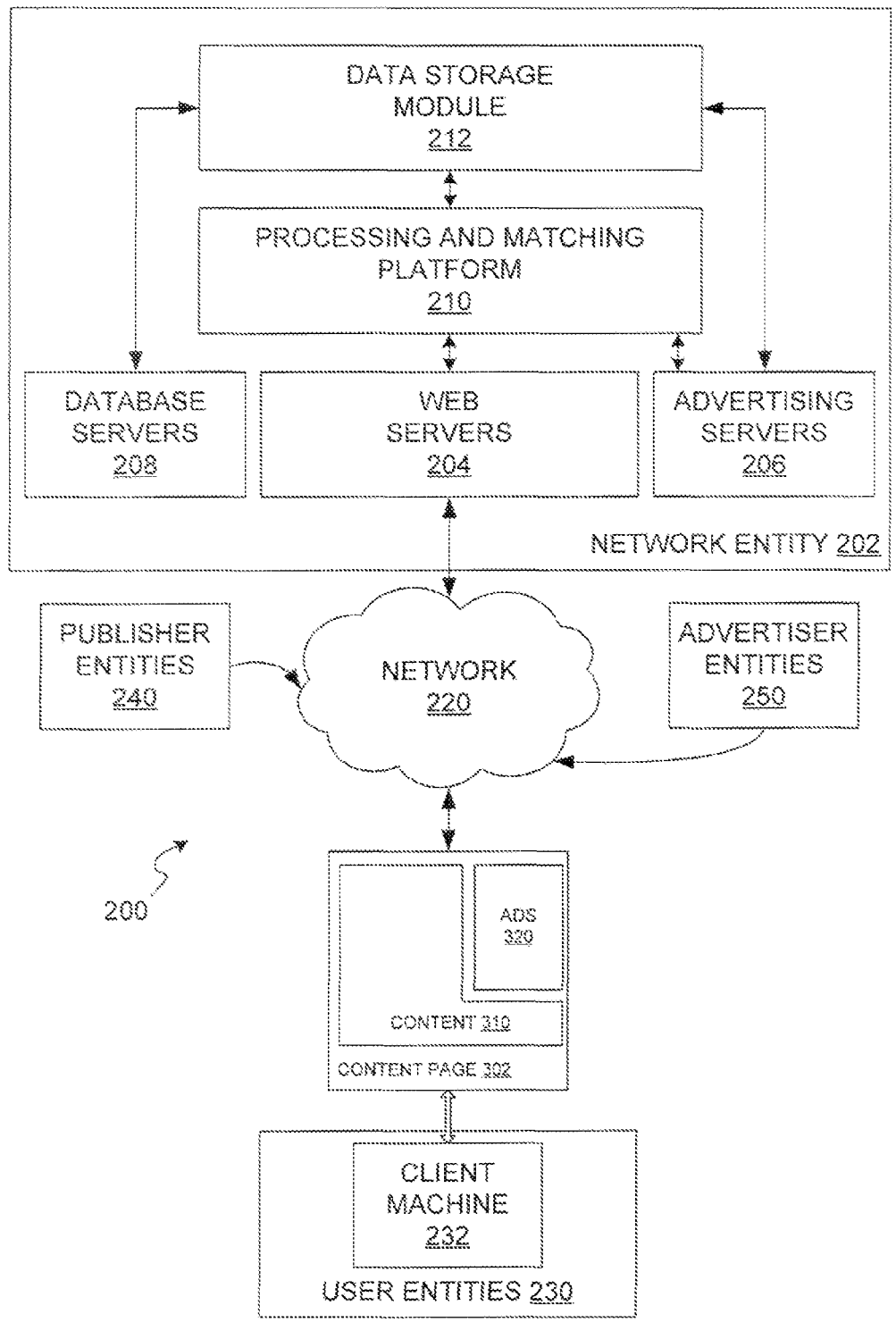
FIG. 2 is a block diagram illustrating an exemplar/network-based network entity 202 containing a system 200.

FIG. 2 is a block diagram illustrating an exemplar/network-based network entity 202 containing a system 200. System 200 may facilitate matching a website identity (e.g., autos.yahoo.com) directly with a set of ad-side terms, independent of the webpage content. The description conveys system 200 within the context of network entity 202 enabling automatic real-time matching of website identity to advertising information. However, it will be appreciated by those skilled in the art that the methods will find application in many different types of computer-based, and network-based, entities, such as, for example, commerce entities, content provider entities, or other known entities having a presence on the network.

In one example, network entity 202 may be a network content service provider, such as, for example, Yahoo!™ and its associated properties. Network entity 202 may include front-end web processing servers 204, which may, for example, deliver webpages 302 and other markup language documents to multiple users 230, and/or handle search requests to network entity 202. Web servers 204 may provide automated communications to/between users 230 of network entity 202. A display event may include a presentation to communicate particular information. In this regard, web servers 204 may deliver images for display within webpages 302, and/or deliver content information to the users in various formats.

Network entity 202 may include processing servers to provide an intelligent interface to the back-end of network entity 202. For example, network entity 202 may include back-end servers, for example, advertising servers 206, and database servers 208. Each server may maintain and facilitate access to data storage modules 212. In one example, advertising servers 206 may be coupled to data storage module 212 and may transmit and receive advertising content, such as, for example, advertisements, sponsored links, integrated links, and other known types of advertising content, to/from advertiser entities via network 220. Network entity 202 may include a processing and matching platform 210 coupled to data storage module 212. Processing and matching platform 210 may be part of a system to facilitate real-time matching of content to advertising information within network-based network entity 202. Platform 210 may be in communication with web servers 204 and advertising servers 206.

Client programs may access network-based network entity 202. Client programs may include an application or system that accesses a remote service on another computer system, known as a server, by way of a network. These client programs may include a browser such as the Internet Explore™ browser distributed by Microsoft™ Corporation of Redmond, Wash., Netscape's Navigator™ browser, the Mozilla™ browser, a wireless application protocol enabled browser in the case of a cellular phone, a PDA, or other wireless device. Preferably, the browser may execute on a client machine 232 of user entity 230 and may access network entity 202 to receive a content page 302 via a network 220, such as, for example, the Internet. Content page 302 may be an example network location. Other examples of networks that a client may utilize to access network entity 202 may include a wide area network (WAN), a local area network (LAN), a wireless network (e.g., a cellular network), a virtual private network (VPN), the Plain Old Telephone Service (POTS) network, or other known networks.

Other entitles such as, for example, publisher entitles 240 and advertiser entities 250, may access network-based network entity 202 through network 220. Publisher entities 240 may communicate with both web servers 204 and user entitles 230 to populate webpages 302 with appropriate content information 310 and to display webpages 302 for users 230 on their respective client machines 232. Publishers 240 may be the owners of webpages 302, and each webpage 302 may receive and display advertisements 320. Publishers 240 typically may aim to maximize advertising revenue while providing a positive user experience. Publisher entities 240 may include website that has inventory to receive delivery of advertisements, including messages and communication forms used to help sell products and services. The publisher's website may display a website may have webpages and advertisements. Visitors or users 230 may include those individuals that access webpages through use of a browser.

Advertiser entities 250 may communicate with web servers 204 and advertising servers 206 to transmit advertisements for display as ads 320 in those webpages 302 requested by users 230. Online advertisements may be communication devices used to help sell products and services through network 220. Advertiser entities 250 may supply the ads in specific temporal and thematic campaigns and typically try to promote products and services during those campaigns.

In regards to online marketing, contextual advertising involves four primary entities. Publishers 240 may own a discrete set of multiple webpages as part of a website 330

(FIG. 3) and may rent a small portion of webpage 302 to advertisers 250. Advertisers 250 may supply advertisements, with goal of promoting products or services. Users 230 may visit webpage 302 interact with ads 320. Finally, ad network 202 may have a role in selecting the ads 320 for the given user 230 visiting a page 302.

Content 310 may include text, images, and other communicative devices. Content 310 may be separate from the structural and graphic design of webpage 302 and website 330. Here, webpage 302 may provide a framework into which content 310 may be inserted. A Content Management System may change and update content 310.

Figure 3:
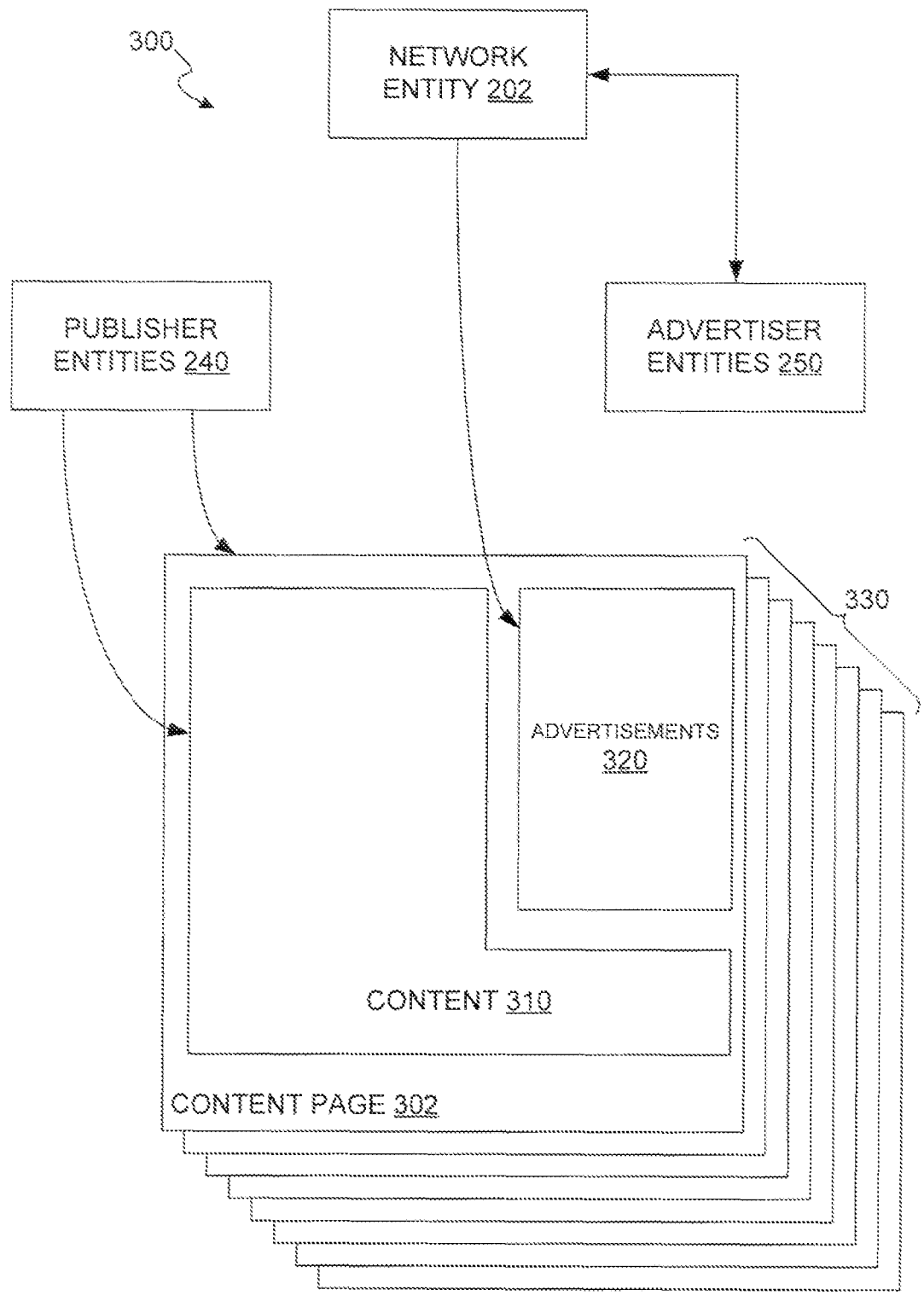
FIG. 3 is block diagram illustrating an exemplary interface 300 to display content 310 and associated advertising information 320 to users 230.

FIG. 3 is block diagram illustrating an exemplary interface 300 to display content 310 and associated advertising information 320 to users 230. Interface 300 may include content page 302, such as, for example, a webpage requested by user 230 or an agent of user 230. Content page 302 may incorporate content information provided by publishers 240 and displayed in a content area 310. Published information may include articles and other data of interest to users 230. In one example, content 310 may include published information displayed in at least one format, such as text, video, audio, and hyperlinks.

Webpage 302 further may incorporate advertisements 320 provided by advertiser entities 250 via network entity 202. In an example, an advertising agency (not shown) may be associated with network entity 202 and the advertiser entities 250 to provide advertisements 320. System 200 may transmit selected advertisements to publishers 240 for subsequent transmission to users 230. Content page 302 may display the advertisements in an advertisements area.

Publisher entity 240 may manage a website 330. Website 330 may be a collection of related digital assets addressed with a common domain name or Internet Protocol (IP) address in an Internet Protocol-based network. Website 330 (site 330) may be the set of pages that form an entire web domain, where a web domain may include a Domain Name System (DNS) identification label that defines a realm of administrative autonomy, authority, and/or control in network 220. One or more web servers may host website 330.

As noted above, website 330 may have multiple webpages. For any given client machine 232, advertisements may be displayed on only those webpages visible on the monitor of user 230. While the content of each webpage may be predetermined, the displayed advertisements themselves typically are determined in real time. Here, the system still may consider the content of each webpage as part of website 330 even if not displayed at a given moment.

Website 330 (or domain 330) may include words, phrases, and other discriminative features that a system may utilize to characterize the website identity. The system may characterize these features by the number of times or frequency in which the feature appears in website 330. In addition, the system may characterize the features by the average 'aboutness' of the feature with respect to website 330 through a site-level average term frequency-inverse document frequency (TF.IDF). Moreover, the system may utilize phrases that have a high propensity for clicks on website 330 to characterize the website identity. Preferably, the website identity does not incorporate information about specific words on website 330. Rather, terms within the website URL (e.g., autos.yahoo.com) may be used to characterize the website identity.

Clickable Terms Models

The following details a clickable terms approach to maximum-entropy (ME) click modeling. This approach involves matching a website identity (e.g., autos.yahoo.com) directly with a set of ad-side terms, independent of webpage content. The relative clickability of ad-side terms on a given website is used to form a new set of features to train the maximum-entropy click model. In particular, the below discussion sets out five maximum-entropy click models expressed in equations (3), (7) and (8)-(10). The discussion then sets out three different term importance weights in equations (11)-(13) that may be utilized in the third, fourth, and fifth maximum-entropy click models as expressed equations (8)-(10) to grant a relative importance to each ad-side term. In experiments, the below features achieve significant gains in click-through-rate (CTR) over a model that uses only lexical match.

To derive the clickable terms approach, a relatively simple maximum-entropy click model first is developed to estimate the click probability of ad impression. The model is simple in that it is based solely on ad rank and the identity of the website hosting the requested webpage. The equation derived for the first maximum-entropy click model then is used to derive a new feature representation for the ideal case where the equation holds exactly. This second maximum-entropy click model is based on ad rank, the identity of the website hosting the requested webpage, and a set of unique ad-side terms in a particular ad impression. This second maximum-entropy click model also is simple in that makes an assumption that does not always hold true in practice.

As discussed in more detail below, the two simple ME click models assume that the ad-side terms are conditionally-independent of one-another and of the rank of an advertisement within a give advertising slate for a given click event on a website. In practice, this conditionally-independent assumption may not hold exactly. In other words, the equations derived for the first and second maximum-entropy click models generally do not hold out in the field and there is room to optimize them.

To optimize the equation derived for the simple ME click models, the techniques incorporate various degrees of freedom into the equation. One way this is done is by utilizing a weighted sum over a new set of features. The below details the following three feature representations that are based on this idea: (i) Bayesian feature representation, (ii) Single-feature representation, and (iii) Threshold-based feature representation. The third, fourth, and fifth maximum-entropy click models are developed through these approaches and a system may utilize the three feature sets to train a maximum-entropy click model.

After setting out the five maximum-entropy click models, the clickable terms approach to maximum-entropy (ME) click modeling also takes into account the importance weight for terms on a given website. Here, the approach uses three different parameterizations for the term importance weights: (i) uniform, (ii) average, and (iii) per-term/term-dependent. Basically, the uniform weighting assigns a weight of one to each term and the average weighting is a function of the number of unique ad-side terms. In term-dependent weighting, the approach notes that terms that co-occur with a large number of other terms may be less important, on average, than terms that co-occur with a small number of terms. This is similar to a per-ad basis situation for the average weighting.

Table of Notations

A variety of symbols and other notations are used to convey the below clickable terms approach to maximum-entropy click modeling. While the description of these notations may appear elsewhere in this document, a summary is provided in Table I below:

TABLE I

| Symbol | Description |
|---|---|
| !c(a) | a lack of a click event on ad impression a; a logical negation of c(a) |
| ∈ | means that something is an element of (i.e., belongs to) a particular set |
| ∀p, k | for all combinations of website identity p and ad-side term $T_k$ |
| * | a mark to distinguish a second maximum-entropy click model from a first maximum-entropy click model |
| $f_k'(p, T(a))$ | a weighted sum of a log-likelihood ratio $\mathcal{L}_{p,k}$ of a term $T_k$ given a website identity p |
| $f_{p,k}'$ | an importance weight for the kth ad-side term $T_k$ in the global set of unique ad-side terms T on website identity p |
| $w_{p,k}'$ | model weight for ad-side term $T_k$ on website identity p |
| : p | |
| \|T(a)\| | a total number of unique ad-side terms T in a particular ad impression a |
| ~ | "is distributed as" |
| $\Sigma_i$ | an addition of a set of i numbers leading to a sum |
| = | defined as |
| a | a particular ad impression |
| $a \in X_{te}$ | an event reflecting that ad impression a is in a held-out test set $X_{te}$ composed of ad impressions |
| b(a) | an advertiser's bid amount for a |
| c(a) | a click event on ad impression a |
| cost (a) | a cost to an advertiser for a click on ad impression a |
| DCG | a discounted cumulative gain |
| exp( ) | a base of a natural logarithm system - exponential function e - raised to a power inside a parentheses |
| $f_i(p, r(a))$ | an ith feature of a maximum-entropy click model |
| i | a counter |
| IDCG | a discounted cumulative gain obtained from an ideal ranking of the data |
| j | a counter |
| k | a counter |
| l | a counter |
| log( ) | a natural logarithm of a quantity inside a parentheses using base e (e.g., $\log_e(\ )$) |
| $\log_2(\ )$ | a binary logarithm of a quantity inside a parentheses using base 2 |
| $\mathcal{L}_{p,k}$ | a log-likelihood ratio of a term $T_k$ given a website identity p |
| N | a last number of a counter |
| n | a counter |
| NDCG | a normalized discounted cumulative gain |
| p | a website identity/identification. Note that p does not incorporate information about specific words on a website. |
| Pr(A\|B) | a click probability of A given B |
| Pr(c(a)) | a click probability of ad impression a |
| Pr(c(a)\|p, r(a)) | a click probability of ad impression a for a given website identity p and rank of ad impression a within a given advertising slate |
| r(a) | a rank of ad impression a within a given advertising slate |
| R(a) | a binary variable that equals one if ad impression a was clicked; otherwise R(a) = 0 |
| site (a) | represents the website on which ad impression a appeared |
| T | a global set of unique ad-side terms $\{T_0, \ldots, T_{N-1}\}$ |
| T(a) | a set of unique ad-side terms T in a particular ad impression a |
| $T_k$ | a kth ad-side term in T |
| $T_k \in a$ | an event reflecting that ad-side term $T_k$ is in ad impression a |
| $T_k \in T(a)$ | an event reflecting that ad-side term $T_k$ is in ad impression a |
| $w_i$ | an ith maximum-entropy click model weight |
| $w_{r(a)}$ | a rank-specific weight |
| $X_{te}$ | a held-out test set composed of ad impressions |
| $\alpha_{p,k}$ | a term importance weight for kth ad-side term $T_k$ on website identity p |
| $\mathcal{N}(\mathcal{L}_{p,k}, \sigma)$ | a Gaussian probability distribution with mean $\mathcal{L}_{p,k}$ and standard deviation $\sigma$ |
| $\mathbb{E}_a[\|T(a)\|: p, T_l \in a]$ | an expected number of unique ad-side terms T(a) that co-occur with ad-side term $T_l$ in ads that appear on a website having a website identity p |
| $\mathbb{E}w_{p,k}$ | an expectation value of a model weight $w_{p,k}'$ that may equal a log-likelihood ratio $\mathcal{L}_{p,k}$ of kth ad-side term $T_k$ given a website identity p (namely, $\mathbb{E}w_{p,k} = \mathcal{L}_{p,k}$) |
| $\sigma$ | a standard deviation of a term weight w |

Relatively Simple Maximum-Entropy Click Model

The first maximum-entropy (ME) model developed to estimate the click probability of ad impression is based solely on ad rank r(a) and website identity p of the website hosting the requested webpage. The value provided by each ad rank r(a) reflects a position where the advertisement appears within a given list or slate of contextual ads on the webpage. For example, r(a)=1 represents a case where the advertisement a appears in a top ad position in the given slate of ads. The website identity p may identify a specific website (e.g., finance.yahoo.com) without incorporating information about specific words in the website. In other words, p does not incorporate information about specific words in the website.

Without loss of generality, the initial maximum-entropy click probability may be a ratio of the exponent of the sum of the weighted features of the model to one plus the exponent of the sum of the weighted features of the model:

$$Pr(c(a) \mid p, r(a)) = \frac{\exp(\Sigma_i[w_i f_i(p, r(a)))]}{\exp[\Sigma_i[w_i f_i(p, r(a))) + 1]} \quad (3)$$

where $\Sigma_i$ represents an addition of a set of i numbers leading to a sum, a represents a particular ad impression, c(a) represents a click event on ad impression a, exp( ) represents a base of a natural logarithm system—exponential function e—raised to a power inside a parentheses, $f_i(p, r(a))$ represents an ith feature of a maximum-entropy click model, i represents a counter, p represents website identity/identification. Note that p does not incorporate information about specific words on a site., Pr(c(a)\|p, r(a)) represents a click probability of ad impression a for a given website identity p and rank of ad impression a within a given advertising slate, r(a) represents a rank of ad impression a within a given advertising slate, and $w_i$ represents an ith maximum-entropy click model weight.

By inspection, the equality of equation (3) above holds true if the sum of the weighted features of the model equals the log of the ratio of a click probability of ad impression a to a probability of a lack of a click event on ad impression a:

$$\Sigma_i w_i f_i(p, r(a)) = \log \frac{Pr(c(a), p, r(a))}{Pr(!c(a), p, r(a))} \quad (4)$$

where
- !c(a) represents a lack of a click event on ad impression a; a logical negation of c(a),
- $\Sigma_i$ represents an addition of a set of i numbers leading to a sum,
- a represents a particular ad impression,
- c(a) represents a click event on ad impression a,
- $f_i(p, r(a))$ represents an ith feature of a maximum-entropy click model,
- i represents a counter,
- log( ) represents natural logarithm of a quantity inside a parentheses using base e (e.g., $\log_e$( ),
- p represents website identity/identification,
- Pr(c(a), p, r(a)) represents a click probability of ad impression a for a given website identity p and rank of ad impression a within a given advertising slate,
- r(a) represents a rank of ad impression a within a given advertising slate, and
- $w_i$ represents an ith maximum-entropy click model weight.

In some cases, the sum of the weighted features of the model may not equal the ratio in equation (4) above. However, equation (3) and equation (4) may be used to derive a first feature representation for the ideal case where equation (4) holds exactly.

Ad-side terms are those terms that appear in an advertisement. Some of the terms are unique in that they may be a word or expression used to particularly characterize the advertisement. It is desirable to estimate a probability of click on an advertisement taking into account a set of unique ad-side terms in a particular ad impression a. Here, the system may expand in the initial maximum-entropy click probability Pr(c(a)|p, r(a)) of equation (3) above by including T(a) so that the probabilities may be estimated in the form Pr(c(a)|p, r(a), T(a)), where T(a) is the set of unique ad-side terms in ad impression a. In other words, taking into account the website identity p, the rank r(a) of ad impression a within a given advertising slate, and the set of unique ad-side terms T(a) in ad impression a, what is the probability Pr of a click event c(a) on ad impression a? Equation (4) above may be expanded with T(a) so that the sum of the model weighted website identity, ad impression rank, and unique ad-side term set features equals the log-likelihood ratio of a click probability of ad impression to a probability of a lack of a click event on that ad impression:

$$\Sigma_i w_i^* f_i^*(p, r(a), T(a)) = \log \frac{Pr(c(a), p, r(a), T(a))}{Pr(!c(a), p, r(a), T(a))} \quad (5)$$

where
- !c(a) represents a lack of a click event on ad impression a; a logical negation of c(a),
- * a mark to distinguish a second maximum-entropy click model from a first maximum-entropy click model
- $\Sigma_i$ represents an addition of a set of i numbers leading to a sum,
- a represents a particular ad impression,
- c(a) represents a click event on ad impression a,
- $f_i^*(p, r(a), T(a))$ represents an ith feature of a maximum-entropy click model,
- i represents a counter,
- log( ) represents a natural logarithm of a quantity inside a parentheses,
- p represents website identity/identification. Note that p does not incorporate information about specific words on a site.,
- Pr(c(a), p, r(a), T(a)) represents a click probability of ad impression a for a given website identity p, ad impression a rank r(a) within a given advertising slate, and ad impression a unique ad-side terms set,
- r(a) represents a rank of ad impression a within a given advertising slate,
- T(a) represents a set of unique ad-side terms in a particular ad impression a, and
- $w_i^*$ represents an ith maximum-entropy click model weight.

Equation (4) above represents a first maximum-entropy click model and equation (5) above represents a second maximum-entropy click model, a difference being that equation (5) additionally takes into account unique ad-side terms set T(a). Equation (5) may be simplified somewhat by assuming that the ad-side terms are conditionally-independent of one-another and of the advertising slate rank r(a) of ad impression a given the set {c(a), p} of a click event c(a) and website identity p.

In assuming that the ad-side terms are conditionally-independent of one-another and of the advertising slate rank r(a) given {c(a), p}, the set of all possible ad-side terms may be represented by $T = \{T_0, \ldots, T_{N-1}\}$. The event that the kth ad-side term in T is in ad impression a may be represented by $T_k \in T(a)$ or by the shorthand $T_k \in a$. In addition, a log-likelihood ratio of term $T_k$ given the website ID p may be represented as:

$$\mathcal{L}_{p,k} \equiv \log \frac{Pr(T_k(a \mid c(a), p))}{Pr(T_k(a \mid !c(a), p))} \quad (6)$$

where
- !c(a) represents a lack of a click event on ad impression a; a logical negation of c(a),
- a represents a particular ad impression,
- c(a) represents a click event on ad impression a,
- log( ) represents a natural logarithm of a quantity inside a parentheses,
- $\mathcal{L}_{p,k}$ a log-likelihood ratio of a term $T_k$ given a website identity p,
- p represents website identity/identification. Note that p does not incorporate information about specific words on a site.,
- Pr(A|B) represents a click probability of A given B,
- $T_k \in a$ an event reflecting that ad-side term $T_k$ is in ad impression a, and represents a rank of ad impression a within a given advertising slate.

Here, the log-likelihood ratio $\mathcal{L}_{p,k}$ of a term $T_k$ given a website identity p provides a measure of the relative "clickability" of an ad-side term on a particular site.

Based on the assumption that the ad-side terms are conditionally-independent of one-another and of the ad impression a slate rank r(a) given the set {c(a), p}, then equation (5) can be factored so that the sum of the model weighted website identity, ad impression rank and unique ad-side term set features equals the sum of the weighted website identity and ad impression rank features plus the sum of the term log-likelihood ratio for a given website identification:

$$\Sigma_j w_j^* f_j^*(p, r(a), T(a)) = \log\frac{Pr(c(a), p, r(a))}{Pr(!c(a), p, r(a))} + \sum_{T_k \in a}\log\frac{Pr(T_k(a \mid c(a), p))}{Pr(T_k(a \mid !c(a), p)}$$

or, after reducing, $$\Sigma_j w_j^* f_j^*(p, r(a), T(a)) = \Sigma_i w_i f_i(p, r(a)) + \sum_{T_k \in a} L_{p,k}, \text{ with} \quad (7)$$

$$\mathcal{L}_{p,k} \equiv \log\frac{Pr(T_k(a \mid c(a), p))}{Pr(T_k(a \mid !c(a), p))}$$

where
!c(a) represents a lack of a click event on ad impression a; a logical negation of c(a),
$\epsilon$ means that something is an element of (i.e., belongs to) a particular set
* represents a mark to distinguish a second maximum-entropy click model from a first maximum-entropy click model,
$\Sigma_i$ represents an addition of a set of i numbers leading to a sum,
a represents a particular ad impression,
c(a) represents a click event on ad impression a,
$f_i(p, r(a))$ represents an ith feature of a maximum-entropy click model,
i represents a counter,
j represents a counter,
k represents a counter,
log( ) represents a natural logarithm of a quantity inside a parentheses,
$\mathcal{L}_{p,k}$ represents a log-likelihood ratio of a term $T_k$ given a website identity p,
p represents a website identity/identification. Note that p does not incorporate information about specific words on a site.,
Pr(A|B) represents a click probability of A given B,
r(a) represents a rank of ad impression a within a given advertising slate,
T(a) represents a set of unique ad-side terms in a particular ad impression a,
$T_k \in a$ represents an event reflecting that ad-side term $T_k$ is in ad impression a,
$T_k$ represents a kth ad-side term in T, and
$w_j$ represents a jth maximum-entropy click model weight.
Here, the right hand side of equation (7) above, $$\Sigma_i w_i f_i(p, r(a)) + \sum_{T_k \in a} L_{p,k},$$

provides a measure of the relative "clickability" of an ad-side term on a particular site.

Note how the weighted sum of the second maximum-entropy click model of equation (7) is equal to the weighted sum of the first maximum-entropy click model of equation (4) plus a sum of a log-likelihood ratio of a term given a website identity. In other words, $\Sigma_j^{w_j*f_j*}(p, r(a), T(a))$ from equation (5) is equal to $\Sigma_i w_i f_i(p, r(a))$ from equation (4) plus a sum of $\mathcal{L}_{p,k}$ terms. Thus, in an ideal case where equation (4) and equation (5) hold exactly, the ME click model for estimating Pr(c(a)|p, r(a), T(a)) actually reuses the equation (3) weights and features of the first maximum-entropy click model for estimating Pr(c(a)|p, r(a)). As noted above, the $\mathcal{L}_{p,k}$ values in equation (6) and on the right hand side of equation (7) provide a measure of the relative "clickability" of an ad-side term on a particular site. The $\mathcal{L}_{p,k}$ values are used below to define various feature representations for additional maximum-entropy click models in the following section.

Table II below shows the top-ten and bottom-ten clickable ad-side terms for an example run of the sports.yahoo.com website based on $\mathcal{L}_{p,k}$ values.

TABLE II

| Ad-side term ($T_k$) | $\mathcal{L}_{p,k}$ values |
|---|---|
| kentucky derby | 4.190 |
| maria sharapova | 4.169 |
| pancreatic disease | 3.905 |
| rafael nadal | 3.887 |
| u conn | 3.825 |
| spartan football | 3.822 |
| Ringside | 3.801 |
| roger federer | 3.783 |
| andy murray | 3.760 |
| serena Williams | 3.727 |
| //////////////////// | /////////// |
| Cost | −0.582 |
| Water | −0.594 |
| Travel | −0.621 |
| Filter | −0.655 |
| Discount | −0.657 |
| Airfare | −0.661 |
| Buy | −0.699 |
| Flight | −0.762 |
| Save | −0.923 |
| Ship | −0.966 |

The sports.yahoo.com website has a "sports" identity from its sports.yahoo.com URL. Most of the terms in the top-ten list are directly related to sports (specifically, tennis). Hence, the $\mathcal{L}_{p,k}$ values appear to do a good job of identifying ad-side terms that are topically relevant to the website sport identity. The $\mathcal{L}_{p,k}$ values also identify the term, pancreatic cancer, as being clickable. While pancreatic cancer is not directly relevant to sports, one can imagine how this term might be of interest to some of the users who frequent this site. The bottom-ten list is composed entirely of unigrams that are unrelated to the website identity.

Figure 4:
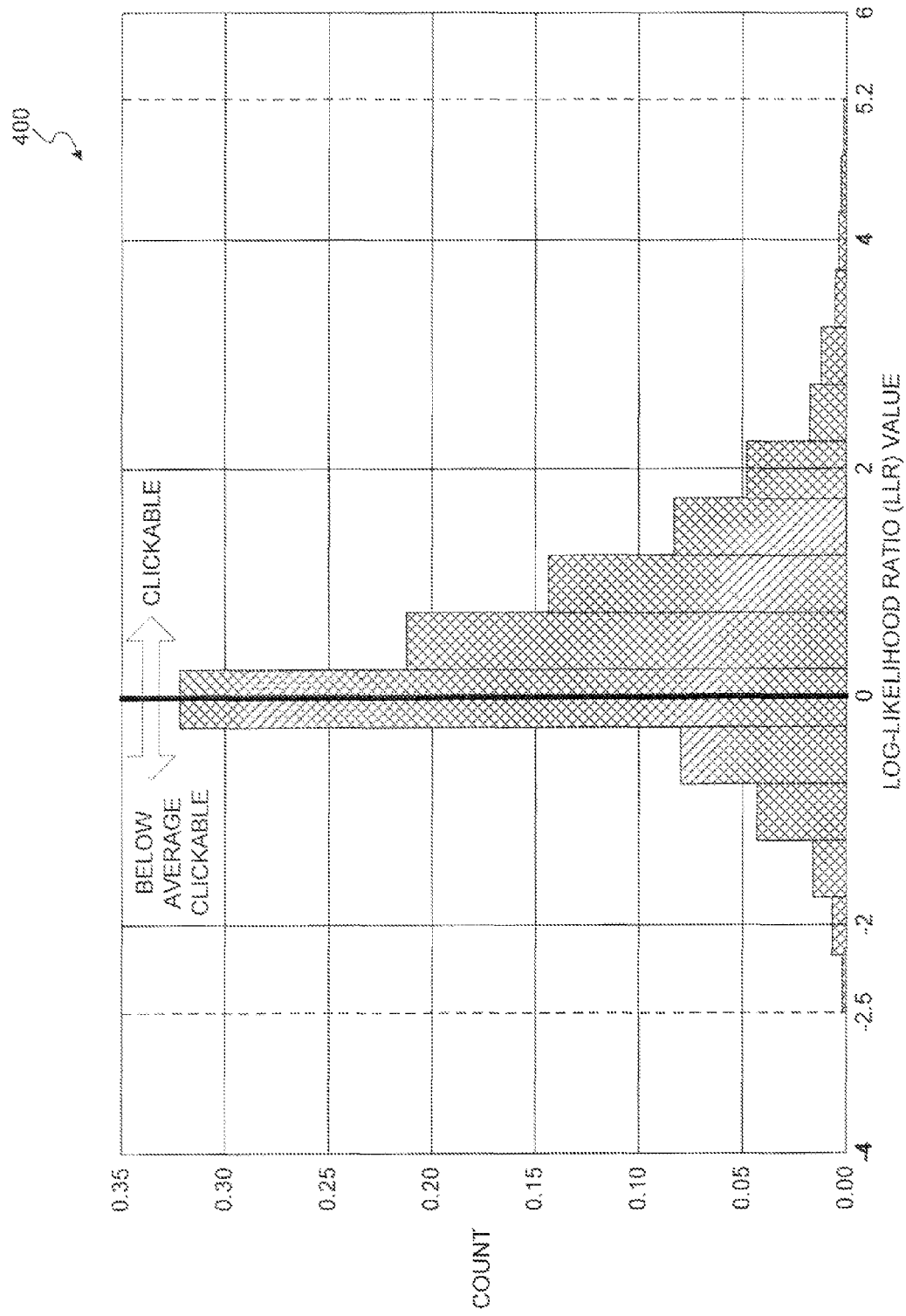
FIG. 4 is a graph illustrating a histogram 400 of the log-likelihood ratio $\mathcal{L}_{p,k}$ values across all websites and ad-side terms.

FIG. 4 is a graph illustrating a histogram 400 of the log-likelihood ratio $\mathcal{L}_{p,k}$ values across all websites and ad-side terms. Histogram 400 shows that a significant number of $\mathcal{L}_{p,k}$ values are negative, which indicates below-average clickability. Importantly, the list of $\mathcal{L}_{p,k}$ values not only captures terms that are "clickable" on a particular website 330, but also terms that are relatively "unclickable." The $\mathcal{L}_{p,k}$ values have a positive bias due to the fact that they are only computed for ad-side terms that occurred in at least ten clicked ads on the given website p.

Feature Representation

While the above first maximum-entropy click model of equation (4) and the second maximum-entropy click model of equation (7) may be sufficient under some circumstances, adding various degrees of freedom into these equations may produce optimized maximum-entropy click models. One way this is done is by utilizing a weighted sum over a new set of features. The below details the following three feature representations that are based on this idea: (i) Bayesian feature representation, (ii) Single-feature representation, and (iii) Threshold-based feature representation. Under this approach, a system may utilize the three feature sets to train a maximum-entropy click model.

As noted, the first maximum-entropy click model of equation (4) uses information about a website identity p and a rank of ad impression a within a given advertising slate r(a) to estimate a click probability of ad impression a through Pr(c(a)|p, r(a)). The second maximum-entropy click model of equation (7) augments this with information about the set of ad-side terms T(a) to estimate a click probability of ad impression a in the form of Pr(c(a)|p, r(a), T(a)). The second maximum-entropy (ME) click model of equation (7) relies on a conditional independence assumption. Thus, if the ad-side terms are conditionally-independent of one-another and of the advertising slate rank r(a) of ad impression a given the set {c(a), p} of a click event c(a) and website identity p, then estimates of Pr(c(a)|p, r(a), T(a)) could be generated by plugging the weighted sum $\Sigma_i w_i f_i(p, r(a))$ defined by equation (7) into an ME click model. However, the conditional independence assumption may not hold exactly in practice, leaving room to enhance equation (7). The system may achieve better results if various degrees of freedom were incorporated into equation (7) (reproduced below):

$$\Sigma_j w_j^* f_j^*(p, r(a), T(a)) = \sum_i w_i f_i(p, r(a)) + \sum_{T_k \in a} \mathcal{L}_{p,k} \qquad (7)$$

One way to incorporate degrees of freedom into equation (7) is to replace the sum of the log-likelihood ratio value terms $$\sum_{T_k \in a} \mathcal{L}_{p,k}$$

in equation (7) with a weighted sum over a new set of features. These new features should roughly capture the information contained in the $\mathcal{L}_{p,k}$ terms while introducing some new degrees of freedom to the maximum-entropy click model. Towards this idea, the below details the following three feature representations: (i) Bayesian feature representation, (ii) Single-feature representation, and (iii) Threshold-based feature representation. A prior probability distribution of an uncertain quantity x is the probability distribution that would express one's uncertainty about x before the "data" are taken into account and the three representations are designed for a regularized maximum-entropy click model that assigns Gaussian priors to the model weights. Covariance is a measure of how much two variables change together and the system assumes for simplicity that the Gaussian priors have diagonal covariance. As a result of this assumption, every feature has a mean and standard deviation for the corresponding click model weight.

Bayesian Feature Representation

A first way to incorporate additional degrees of freedom into the second maximum-entropy click model of equation (7) is to define a prior distribution over the log-likelihood ratio $\mathcal{L}_{p,k}$ terms in equation (7). A Gaussian distribution is a theoretical normal distribution with finite mean and variance that distributed events in a bell shaped curve. Moreover, an expectation value of a variable is the integral of the variable with respect to its probability measure. Assuming that the $\mathcal{L}_{p,k}$ terms in equation (7) have a Gaussian distribution rather than being fixed, the system can obtain a maximum-entropy click model formulation by replacing each $\mathcal{L}_{p,k}$ term in equation (7) with a new/second model weight $w'_{p,k}$, where $w'_{p,k}$ is the kth maximum-entropy click model weight and is Gaussian. Here, the expectation value $\mathbb{E}$ of new/second model weight $w'_{p,k}$ is equal to a log-likelihood ratio of kth ad-side term $T_k$ given a website identity p. In other words, $\mathbb{E} w'_{p,k} = \mathcal{L}_{p,k}$. Also, a defined associate feature $f'_{p,k}$ of this third maximum-entropy click model may have a default value of one. With these definitions, the sum of the model weighted website identity, ad impression rank and unique ad-side term set features equals the sum of the weighted website identity and ad impression rank features plus the weighted sum of the associated feature:

$$\Sigma_k w'_{p,k} f'_{p,k} \sum_j w_j^* f_j^*(p, r(a), T(a)) = \sum_i w_i f_i(p, r(a)) + \sum_k w'_{p,k} f'_{p,k}, \qquad (8)$$

with $$f'_{p,k} \equiv 1(T_k \in a) \forall\, p, k$$

$$w'_{p,k} \sim \mathcal{N}(\mathcal{L}_{p,k}, \sigma) \forall\, p, k$$

where

∀p,k for all combinations of website identity p and ad-side term $T_k$

* represents a mark to distinguish a second maximum-entropy click model from a first maximum-entropy click model, $f_{p,k}$ represents an importance weight for the kth ad-side term $T_k$ in the global set of unique ad-side terms T on website identity p, $w'_{p,k}$, ~ means approximately equals, $\Sigma_i$ represents an addition of a set of i numbers leading to a sum, ≡ represents defined as, a represents a particular ad impression, $f_i(p, r(a))$ represents an ith feature of a maximum-entropy click model, i represents a counter, j represents a counter, k represents a counter, $\mathcal{L}_{p,k}$ represents a log-likelihood ratio of a term $T_k$ given a website identity p, p represents a website identity/identification. Note that p does not incorporate information about specific words on a website., r(a) represents a rank of ad impression a within a given advertising slate, T(a) represents a set of unique ad-side terms in a particular ad impression a, $w_j$ represents a jth maximum-entropy click model weight, $\alpha_{p,k}$ a term importance weight for kth ad-side term $T_k$ on website identity p, $\mathcal{N}(\mathcal{L}_{p,k}, \sigma)$, $\mathbb{E} w'_{p,k}$ represents an expectation value $\mathbb{E}$ of a model weight $w'_{p,k}$ that may equal a log-likelihood ratio $\mathcal{L}_{p,k}$ of kth ad-side term $T_k$ given a website identity p (namely, $\mathbb{E} w'_{p,k} = \mathcal{L}_{p,k}$), and σ represents a standard deviation of a term weight $w'_{p,k}$.

This Bayesian feature representation defines one separate model weight for every combination of website identity p and ad-side term $T_k$. Note that equation (7) and equation (8) are exactly equivalent when σ=0. When σ=0, the ME model defined by the weighted sum in equation (8) is equivalent to a Naive Bayes model, a simple probabilistic classifier based on applying Bayes' theorem from Bayesian statistics with strong (naive) independence assumptions.

The third maximum-entropy click model of equation (8) may be viewed as a Bayesian network where the $\mathcal{L}_{p,k}$ terms are assigned a Gaussian prior. Thus, these features and to the corresponding model weights $\{f_{p,k}\}_{p,k}$ and $\{w'_{p,k}\}_{p,k}$ may be referred to as a Bayesian feature representation for a clickable terms model. Note that $f_{p,k}$ can be viewed as a kind of importance weight for the kth ad-side term $T_k$ in the global set of unique ad-side terms T on website identity p. The third maximum-entropy click model of equation (8) assumes that all ad-side terms are equally weighted. In other words, the third maximum-entropy click model of equation (8) assumes in an example that $f_{p,k}$=1 for all website identities p and counters k. In another example that generalizes the third maximum-entropy click model of equation (8), importance weight $f'_{p,k}$ may be defined to be $\alpha_{p,k}$, where $\alpha_{p,k}$ is a term importance weight for kth ad-side term $T_k$ on website identity p. Importance weight $f'_{p,k}$ and importance weight $\alpha_{p,k}$ are discussed in more detail below.

Single-Feature Representation

A second way to incorporate additional degrees of freedom into the second maximum-entropy click model of equation (7) is to use low-dimensional feature representations. As noted, the Bayesian feature representation defines one separate model weight for every combination of website identity p and ad-side term $T_k$. This representation may have fairly high dimensionality in cases where at least one of the website identity p and the set of ad-side terms T is large. Thus, training a model with the Bayesian representation of equation (8) may be fairly expensive in terms of memory and computation.

A fourth maximum-entropy click model using two low-dimensional feature representations may serve as an alternative to the Bayesian features of equation (8). Each feature representation of the fourth maximum-entropy click model use a set of features in the form $f'_p(p, T(a))$, which represents a weighted sum of a log-likelihood ratio of a term given a website identity.

Replacing the $\mathcal{L}_{p,k}$ terms in equation (7) with a weighted sum over these features results in the sum of the model weighted website identity, ad impression rank and unique ad-side term set features equals the sum of the weighted website identity and ad impression rank features plus the weighted sum of the website identity and ad-side term set features:

$$\sum_j w^*_j f^*_j(p, r(a), T(a)) = \sum_i w_i f_i(p, r(a)) + \sum_k w'_k f'_k(p, T(a)), \quad (9)$$

with $$f'_o(p, T(a)) \equiv \sum_{T_l \in a} \alpha_{p,l} L_{p,l},$$

$$w'_o \sim N(0, \sigma)$$

where $\epsilon$ means that something is an element of (i.e., belongs to) a particular set $\forall$p,k for all combinations of website identity p and ad-side term $T_k$ \* represents a mark to distinguish a second maximum-entropy click model from a first maximum-entropy click model, $f_k'(p, T(a))$ represents a weighted sum of a log-likelihood ratio $\mathcal{L}_{p,k}$ of a term $T_k$ given a website identity p, $w_k^i$ represents, $\sim$ represents approximately equals, $\Sigma_i$ represents an addition of a set of i numbers leading to a sum, $\equiv$ represents defined as, a represents a particular ad impression, $f_i^*(p, r(a), T(a))$ represents a jth feature of a maximum-entropy click model, i represents a counter, j represents a counter, k represents a counter, l represents a counter, $\mathcal{L}_{p,l}$ represents a log-likelihood ratio of a term $T_l$ given a website identity p, p represents a website identity/identification. Note that p does not incorporate information about specific words on a website., r(a) represents a rank of ad impression a within a given advertising slate, T(a) represents a set of unique ad-side terms T in a particular ad impression a, $T_l \in a$ represents an event reflecting that ad-side term $T_l$ is in ad impression a, $\alpha_{p,l}$ represents a term importance weight for lth ad-side term $T_l$ on website identity p, $\mathcal{N}(0, \sigma)$, and $\sigma$ represents a standard deviation of a term weight w.

In the fourth maximum-entropy click model of equation (9) above, which also may be referred to as the single-feature representation, the feature $f_k'(p, T(a))$ represents a weighted sum of the equation (7) log-likelihood ratio $\mathcal{L}_{p,k}$ of a term $T_k$ given a website identity p. The term importance weight $\alpha_{p,l}$ in equation (9) applies an influence value to the log-likelihood ratio $\mathcal{L}_{p,k}$ that reflects a relative importance of a given ad-side term $T_l$ as it would have on a website whose website identity is p relative to the other ad-side terms. If each ad-side term had the same importance in that $\alpha_{p,l}$=1 for all l, then the feature $f_k'(p, T(a))$ in equation (9) reduces down to the sum of the log-likelihood ratio $\mathcal{L}_{p,k}$ in equation (7). The term importance weight $\alpha_{p,l}$ may have one of a uniform, average, and term-dependent parameterization as detailed below.

Threshold-Based Feature Representation

A third way to incorporate additional degrees of freedom into the second maximum-entropy click model of equation (7) is to use threshold-based feature representations. The features in the threshold-based feature representation correspond to a total number of ad-side terms T whose log-likelihood ratio value $\mathcal{L}_{p,k}$ is above or below a predetermined threshold. Similar to the fourth maximum-entropy click model of equation (9), this fifth maximum-entropy click model uses two low-dimensional feature representations that may serve as an alternative to the Bayesian features of equation (8). Each feature representation of the fifth maximum-entropy click model use a set of features in the equation (9) form $f_p'(p, T(a))$. However, instead of representing a weighted sum of a log-likelihood ratio of a term given a website identity as in equation (9), the feature $f_p'(p, T(a))$ represents a cumulative distribution over the log-likelihood ratio values $\mathcal{L}_{p,k}$ for a given ad impression.

Replacing the $\mathcal{L}_{p,k}$ terms in equation (7) with a weighted sum over these features results in the sum of the model weighted website identity, ad impression rank and unique ad-side term set features equals the sum of the weighted website identity and ad impression rank features plus the weighted sum of the website identity and ad-side term set features:

$$f'_k(p, T(a)) \equiv \sum_{T_l \in a} \alpha_{p,l} 1(L_{p,l} \geq k), k \in \{1, \ldots, N\} \quad (10)$$

$$f'_k(p, T(a)) \equiv \sum_{T_l \in a} \alpha_{p,l} 1(L_{p,l} \leq k), k \in \{-N, \ldots, -1\}$$

$$w'_k \sim N(0, \sigma), k \in \{-N, \ldots, -1, 1, \ldots, N\}$$

where
- $\in$ means that something is an element of (i.e., belongs to) a particular set
- $\forall p,k$ for all combinations of website identity p and ad-side term $T_k$
- \* represents a mark to distinguish a second maximum-entropy click model from a first maximum-entropy click model,
- $f_k'(p, T(a))$ represents a weighted sum of a log-likelihood ratio $\mathcal{L}_{p,k}$ of a term $T_k$ given a website identity p,
- $w_k^i$ represents a model weight for ad-side term $T_k$ on website identity p
- ~ "is distributed as,"
- $\Sigma_i$ represents an addition of a set of i numbers leading to a sum,
- $\equiv$ represents defined as,
- a represents a particular ad impression,
- $f_j^*(p, r(a), T(a))$ represents a jth feature of a maximum-entropy click model,
- i represents a counter,
- j represents a counter,
- k represents a counter,
- l represents a counter,
- $\mathcal{L}_{p,l}$ represents a log-likelihood ratio of a term $T_l$ given a website identity p,
- N represents a last number of a counter,
- p represents a website identity/identification. Note that p does not incorporate information about specific words on a website.,
- r(a) represents a rank of ad impression a within a given advertising slate,
- T(a) represents a set of unique ad-side terms T in a particular ad impression a,
- $T_l \in a$ represents an event reflecting that ad-side term $T_l$ is in ad impression a,
- $\alpha_{p,l}$ represents a term importance weight for lth ad-side term $T_l$ on website identity p,
- $\mathcal{N}(0, \sigma)$ represents a Gaussian probability distribution with mean 0 and standard deviation $\sigma$,
- $\sigma$ represents a standard deviation of a term weight w.

In the fifth maximum-entropy click model of equation (10) above, which also may be referred to as the threshold based feature representation, the feature $f_k'(p, T(a))$ represents a weighted sum of the equation (7) log-likelihood ratio $\mathcal{L}_{p,k}$ of a term $T_k$ given a website identity p just as it did in equation (9). However, the feature $f_k'(p, T(a))$ assists threshold based feature representation in capturing a form of cumulative distribution over the log-likelihood ratio values $\mathcal{L}_{p,k}$ for a given ad impression. Experiments leading to histogram 400 of FIG. 4 provide an example value of N=4 for the log-likelihood ratio $\mathcal{L}_{p,k}$ values. An advantage of using N=4 for equation (10) above is that its substantially accounts for all ad-side terms that may occur in at least ten clicked ads on a given website whose website identity is p.

Term Importance Weighing

The term importance weight $\alpha_{p,l}$ in equation (8), equation (9), and equation (10) applies an influence value that reflects a relative importance to each ad-side term value with which it is multiplied. In other words, the term importance weight $\alpha_{p,l}$ grants a relative importance to each ad-side term. The term importance weights $\{\alpha_{p,l}\}_{p,k}$ may have one of three different parameterizations: a uniform parameterization, an average parameterization, and a term-dependent parameterization.

Under the uniform weighting approach, the system may assign a weight of one to each ad-side term. As noted, if each ad-side term had the same importance in that $\alpha_{p,l}=1$ for all l, then the feature $f_k'(p, T(a))$ in equation (9) reduces down to the sum of the log-likelihood ratio $\mathcal{L}_{p,k}$ in equation (7). The parameterization of the uniform weighting, where the term importance weight is equal to one, takes the form of equation (11):

$$\alpha_{p,l}=1 \; \forall p,l \quad (11)$$

where
- $\forall p,k$ for all combinations of website identity p and ad-side term $T_k$
- $\equiv$ represents defined as,
- l represents a counter,
- p represents a website identity/identification, and
- $\alpha_{p,l}$ represents a term importance weight for lth ad-side term $T_l$ on website.

While the uniform weighting has merit under some circumstances, a potential issue with the uniform weighting is that the click model resulting from applying the uniform weighting may be sensitive to the total number of unique ad-side terms |T(a)| in a given advertisement. One approach is to normalize each feature. By standardizing each feature, the system may reduce the features to variations by excluding somewhat irrelevant aspects.

Under the average weighting approach, the system may normalize each feature by the total number of unique ad-side terms |T(a)|. This essentially is equivalent to performing L1 normalization on vectors of the features. In the average weighting case, the term importance weights $\alpha_{p,l}$ are actually a function of the number of unique ad-side terms |T(a)| and not a function of the website identity p and the ad-side term identification number k. The parameterization of the average weighting, where the term importance weight is equal to one divided by the total number of unique ad-side terms, takes the form of equation (12):

$$\alpha_{p,l}=1/|T(a)| \; \forall p,l \quad (12)$$

where
- $\forall p,k$ for all combinations of website identity p and ad-side term $T_k$
- $\equiv$ represents defined as,
- l represents a counter,
- p represents a website identity/identification,
- |T(a)| represents a total number of unique ad-side terms T in a particular ad impression a, and
- $\alpha_{p,l}$ represents a term importance weight for lth ad-side term $T_l$ on website.

Under the term-dependent weighting approach, the system may normalize a given ad-side term such as $T_l$ by an expected number $\mathbb{E}$ of unique ad-side terms T(a) that co-occur with ad-side term $T_l$ in ads that appear on a website having a website identity p. Here the parameterization of term-dependent weighting, where the term importance weight is equal to one divided by an expected number of unique ad-side terms that co-occur with ad-side term in ads that appear on a website having a website identity, takes the form of equation (13):

$$\alpha_{p,\ell} \equiv 1/(\mathbb{E}_a[|T(a)|:\ p,\ T_\ell \in a]) \ \forall\ p,\ \ell,\ \text{with} \quad (13)$$

$$\mathbb{E}_a[|T(a)|:\ p,\ T_\ell \in a] = \frac{\sum_a 1(\text{site}(a) = p,\ T_\ell(a) \cdot |T(a)|}{\sum_a 1(\text{site}(a) = p,\ T_\ell(a))}$$

where $\in$ means that something is an element of (i.e., belongs to) a particular set $\forall p, k$ for all combinations of website identity p and ad-side term $T_k$ $f_k'(p, T(a))$ represents a weighted sum of a log-likelihood ratio $\mathcal{L}_{p,k}$ of a term $T_k$ given a website identity pl, $w'_{p,k}$ represents a model weight for ad-side term $T_k$ on website identity p :p $|T(a)|$ represents a total number of unique ad-side terms T in a particular ad impression a, $\Sigma_a$ represents an addition of a set of a numbers leading to a sum, $\equiv$ represents defined as, a represents a particular ad impression, cost (a) represents a cost to an advertiser for a click on ad impression a, l represents a counter, n represents a counter, p represents a website identity/identification, site (a) represents the website on which ad impression a appeared $|T(a)|$ represents a total number of unique ad-side terms T in a particular ad impression a, $T_l$ represents a lth ad-side term in T, $T_l \in a$ represents an event reflecting that ad-side term $T_l$ is in ad impression a, $\alpha_{p,l}$ represents a term importance weight for lth ad-side term $T_k$ on website identity p, and $\mathbb{E}_a[|T(a)|:p,\ T_l \in a]$ represents an expected number $\mathbb{E}$ of unique ad-side terms T(a) that co-occur with ad-side term $T_l$ in ads that appear on a website having a website identity p.

Expectation $\mathbb{E}_a$ may be computed empirically on the training data and site (a) represents the website on which ad impression a appeared.

The intuition behind the per-term/term-dependent weights is that terms that co-occur with a large number of other terms relatively may be less important, on average, than terms that co-occur with a small number of terms. For example, consider the case where T(a) is comprised of N ad-side terms, which are known to always co-occur with one-another but to never co-occur with any other terms. Since the terms are correlated perfectly with one-another but not correlated with any other terms, the ensemble of terms contains as much information as any single term does by itself. In this case, the term-dependent weighting will assign an importance weight of $\alpha_{p,l}=1/N$ to each of the terms. The ensemble of terms will then effectively be treated as one single term. The average weighting parameterization implements a similar idea, but on a per-ad basis.

Experiments

The above discussion introduced a clickable terms approach to contextual advertising. This approach involves matching a website identity (e.g., autos.yahoo.com) directly with a set of ad-side terms from advertisements, independent of the page content that is the target for the advertisements. Here, the relative clickability of ad-side terms on a given website to form a new set of features for training a maximum-entropy (ME) click model. In particular, the above presented five maximum-entropy click models through equations (3), (7) and (8)-(10) and three different parameterizations for the term importance weights $\{\alpha_{p,l}\}_{p,k}$ in equations (11)-(13) that may be utilized in equations (8)-(10) to grant a relative importance to each ad-side term.

In developing approaches to improve estimating a probability that a candidate online advertisement will receive a click on a particular website, the inventors engaged in a set of experiments performed on offline click data. The experiments investigated the performance of (i) the Bayesian feature representation, (ii) the single-feature representation, and (iii) the threshold-based feature representation and followed up these experiments with a test on live traffic. The resulting clickable terms model achieves significant gains in normalized discounted cumulative gain (NDCG) over a baseline click model that incorporates only lexical match features. The clickable terms model also yields modest, but significant gains in click through rate (CTR) and revenue per impression (RPI) in tests performed on the live web traffic.

Experiments: Offline Evaluation

In the offline experiments, the inventors trained maximum-entropy (ME) click models using the Bayesian feature representation of equation (8), the single-feature representation of equation (9), and the threshold-based feature representation of equation (10), along with the website identity p and the rank r(a) of ad impression a within a given advertising slate. Each of these models also incorporates a lexical match feature. The lexical match feature was designed to measure the cosine similarity between the webpage and ad for a particular vocabulary of extracted words and phrases (i.e., terms). The lexical match feature was continuous. In the offline experiments, the performance of the clickable terms models was compared against a baseline ME model that uses the lexical match feature, along with the website identity p and the rank r(a) features.

In the baseline model, every ad impression was represented by a total of four features. These include two binary features that identify the website identity p and the rank r(a) of the given ad impression, along with the lexical match feature. Each feature vector also included a bias feature, which was set to one.

The baseline model had a total of 12,646 features, of which approximately 12,600 were binary features used to identify a particular website. Note that the observed rank values r(a) were used only during the training phase for each model. Since the particular ad impression a is a function of the rank r(a), and the rank r(a) depends on the click probability of the particular ad impression a, the inventors set r(a)=1 when computing click probabilities for ads during testing.

All ads in a given advertising slate shared the same website identity p and rank r(a) features during testing. As a result, the baseline model relied solely on the lexical match feature to discriminate between ads. The clickable terms models incorporated the same features used in the baseline model, plus one of the three feature sets: (i) the Bayesian feature representation, (ii) the single-feature representation, and (iii) the threshold-based feature representation. Along with the baseline feature representation having a dimensionality of 12,646, the Bayesian feature representation had a dimensionality of 459,462, the single-feature representation had a dimensionality of 12,647, and the threshold-based feature representation had a dimensionality of 12,656.

Training the models involved four areas. The first area included extracting terms from webpages and ads. The second area included learning the clickable terms features. The third area included evaluation metrics. The fourth area included data and experimental setup.

Offline Evaluation: Extracting Terms from Pages and Ads

In the online advertising that is pervasive in commercial search engines, advertisers typically bid on few terms, and the scarcity of data makes ad matching difficult. Suggesting additional bidterms can significantly improve ad clickability and conversion rates. In some network systems, an advertiser can define up to 2,000 bidterms per advertisements.

In the offline experiments, the system engaged in a process to extract a set of words and phrases (i.e., terms) from each webpage and advertisement utilized in the experiments. These terms included unigrams and bigrams, along with a limited number of higher order n-grams. The ad-side terms were extracted from various sources, including the ad title and the ad creative (i.e., the text of the ad), along with a set of advertiser-specified bidterms. The system used these ad-side terms to train clickable terms models according to the clickable terms framework models described above. The system also used the terms to measure lexical match between pages and ads.

Offline Evaluation: Learning the Clickable Terms Features

As noted, the event of a user viewing a given webpage is referred to as an impression of that webpage and the event of viewing an ad is referred to as an ad impression. The ad network space is composed of several large players (e.g., Yahoo!™, Microsoft™, and Google™), along with many smaller companies. Each day and every day, a seemingly endless number of ad impressions are made throughout the Internet on a seemingly endless number of webpage impressions. In those displayed advertisements, online advertisers use a variety of terms in their ads to influence the viewing individual to purchase the listed product or service or, at a minimum, click on the advertisement to investigate further into the advertised item. Not all terms have a general relevance. To perform the offline experiments, it was important to limit the tested data by time, quantity, and relevance.

For the offline experiments, the inventors empirically estimated the log-likelihood ratio $\mathcal{L}_{p,k}$ parameters by limiting the training data to that collected over approximately six weeks from Yahoo!™ and Yahoo!™ partner sites. The collected data included ad impressions, where each ad impression included a binary label representing whether or not the ad was clicked. To limit the size of the clickable terms models, the system computed the log-likelihood ratio $\mathcal{L}_{p,k}$ values for the top 5,000 websites as ranked by total webpage views.

In exploring the term data of ad impressions from 5,000 websites over a six week period, further experiments revealed that certain ads contained indicator terms that did not generalize well to other ads. These terms essentially acted as an identifier for one particular set of ads and were less than useful in generally identifying other ads from the set contained in the 5,000 websites. As a result, their log-likelihood ratio $\mathcal{L}_{p,k}$ values tended to be more indicative of the clickability of that small group of ads than of the general relevance of the terms themselves. In some cases, these indicator terms caused overfitting in the clickable terms models.

To less the chance of the clickable terms models describing random error or noise instead of the desired underlying relationships, the system filtered out terms that were used by fewer than two advertisers. In addition, the system filtered out all ad-side terms that appear in fewer than ten click events. After filtering the available term data by time, quantity, and relevance and calculating the log-likelihood ratio $\mathcal{L}_{p,k}$ value for each term, the system was left with approximately 400,000 log-likelihood ratio $\mathcal{L}_{p,k}$ values in the clickable terms model.

Offline Evaluation: Evaluation Metrics

To derive quantitative measurements for the qualitative phenomena of online ad impressions, the system evaluated each clickable terms model on a held-out test set $X_{te}$, which was composed of ad impressions. Discounted cumulative gain (DCG) is a measure of effectiveness of a web search engine model that uses a graded relevance scale of documents in a search engine result set to measure a usefulness, or gain, of a document based on its position in the result list. The gain is accumulated cumulatively from the top of the result list to the bottom with the gain of each result discounted at lower ranks. In regards to the experiments, the system utilized a normalized discounted cumulative gain (NDCG) to evaluate the ranking performance of the click models. Here, the discounted cumulative gain equaled the sum of a rank specific weight times a relevance binary value of a particular ad impression a:

$$DCG = \sum_{a \in X_{te}} [w_{r(a)}(2^{R(a)}] - 1), \text{ with} \tag{14}$$

$$w_{r(a)} = 1/(\log_2(r(a) + 1))$$

where
- $\in$ means that something is an element of (i.e., belongs to) a particular set
- $\Sigma_i$ represents an addition of a set of i numbers leading to a sum,
- a represents a particular ad impression,
- $a \in X_{te}$ represents an event reflecting that ad impression a is in a held-out test set composed of ad impressions,
- DCG represents a discounted cumulative gain,
- $\log_2($ $)$ a binary logarithm of a quantity inside a parentheses using base 2,
- NDCG represents a normalized discounted cumulative gain,
- r(a) represents a rank of ad impression a within a given advertising slate,
- R(a) represents a binary variable that equals one if ad impression a was clicked; otherwise R(a)=0,
- $w_{r(a)}$ represents a rank-specific weight, and
- $X_{te}$ represents a held-out test set $X_{te}$ composed of ad impressions a.

Here, $w_{r(a)}$ represents a rank-specific weight, and R(a) represents a binary relevance of a particular ad impression a. In other words, if the particular ad impression a was clicked, R(a) takes a value of one and if the particular ad impression a was not clicked, R(a) takes a value of zero.

Search result lists vary in length depending on the query. The system was unable to achieve a consistent performance comparison between the clickable term models from one query to the next using DCG alone. To address this, the system normalized the cumulative gain at each position for a chosen value of particular rank position r(a) across queries. This was done by sorting documents of a result list by relevance, producing an ideal DCG (IDGE) at rank position r(a). For a query, the normalized discounted cumulative gain, or NDCG, is computed as the discounted cumulative gain divided by the ideal ordering of the discounted cumulative gain:

$$NDCG_{r(a)} = DCG_{r(a)}/IDCG_{r(a)} \tag{15}$$

where
- DCG represents a discounted cumulative gain,
- IDCG represents a discounted cumulative gain obtained from an ideal ranking of the data, NDCG represents a normalized discounted cumulative gain, and r(a) a rank of ad impression a within a given advertising slate.

From equation (15), the NDCG values for all queries can be averaged to obtain a measure of the average performance of a clickable terms model ranking process. All NDCG calculations are then relative values on the interval 0.0 to 1.0 and so are cross-query comparable. The NDCG metric was simply defined as DCG divided by the ideal DCG, where the ideal the DCG is one that would be obtained if the data were perfectly ranked. In the experiments, the system set IDCG equal to the total number of clicked ad impressions in the test data (viz., the sum of ads where R(a) took a value of one).

Offline Evaluation: Data and Experimental Setup

The system used the above noted click data collected over a seven-week period for training and testing maximum-entropy click models. The system used the first six weeks of click data were used to train log-likelihood ratio $\mathcal{L}_{p,k}$ values and model weights w. The seventh/final week was used for testing. The total number of click events in the test set was greater than 500,000 click events. For testing, the system first used the maximum-entropy click models to rerank the ad impressions in the test data based on probability-of-click. The system then computed the normalized discounted cumulative gain (NDCG) on the reranked ads using equations (14) and (15) above. The results are shown in Table III:

TABLE III

| Standard deviation σ of weights w. | Uniform weights $\alpha_{p,1}$ | Average weights $\alpha_{p,1}$ | Per-term/ term-dependent weights $\alpha_{p,1}$ |
|---|---|---|---|
| 0.0001 | 0.9828 | /// | /// |
| 0.0010 | 0.9984 | /// | /// |
| 0.0100 | 0.9994 | 0.9804 | 0.9811 |
| 0.1000 | 0.9763 | 0.9856 | 0.9849 |
| 1.0000 | 0.9881 | 0.9990 | 0.9994 |
| 10.0000 | /// | 0.9996 | 1.0000 |
| 100.0000 | /// | 0.9975 | 0.9980 |

Table III above presents offline NDCG results for the Bayesian feature representation of equation (8) above. Recall that the term importance weights $\{\alpha_{p,l}\}_{p,k}$ may have one of three different parameterizations: (i) a uniform parameterization, (ii) an average parameterization, and (iii) a term-dependent parameterization as reflected through equations (11)-(13) above, respectively. The results in Table III include various term importance weights at various values of the standard deviation parameter, σ. The system divided each NDCG value by the maximum NDCG across all values in the table to present scaled offline NDCG results.

From Table III, the scaled NDCG scores ranged from 0.9763 1.0000 and are fairly comparable across the three feature weighting schemes. The standard deviation σ of a data set is the square root of its variance and the optimum standard deviation σ value for the uniform weights case was 0:01, which was quite low. This shows that the means of the model weights fit the data fairly well, which implies that the system may be able to produce comparable NDCG results from a simpler model. Note that the optimum standard deviation σ value was significantly higher for the average weights and per-term/term-dependent weights cases. This was to be expected, since the term importance weights (i.e., the $\alpha_{p,l}$ parameters) are proportionately lower for these two weighting schemes.

The above discussion introduced three feature representations to roughly capture the information contained in the $\mathcal{L}_{p,k}$ terms while introducing some new degrees of freedom to the maximum-entropy click model: (i) Bayesian feature representation, (ii) Single-feature representation, and (iii) Threshold-based feature representation. Table IV below presents the baseline system, the single-feature, representation, the threshold based representation, and the Bayesian feature representation relative to he best model from Table III:

TABLE IV

| Model | Relative improvement in (1 − NDCG) |
|---|---|
| Baseline | 0.00% |
| Bayesian features, per-term weights | 11.77% |
| Single feature, uniform weights | 4.85% |
| Single feature, average weights | 9.34% |
| Single feature, per-term weights | 9.46% |
| Threshold-based, uniform weights | 5.84% |
| Threshold-based, average weights | 9.29% |
| Threshold-based, per-term weights | 9.71% |

Table IV compares the best model from Table III with the baseline system and with the single-feature and threshold based representations. The system set the standard deviation σ parameter to a value of one for the single-feature and threshold based representations. Table IV presents the improvement in (1−NDCG) for each model relative to the baseline. The relative improvement percentage metric was computed as a ratio of the baseline click model ranking performance as in equation (16):

$$\text{Relative improvement in } (1 - NDCG) = \frac{(1 - NDGC_0) - (1 - NDGC)}{(1 - NDGC_0)} \cdot 100\% \quad (16)$$

where

NDCG represents a normalized discounted cumulative gain, and $NDCG_0$ represents a ranking performance of a baseline click model.

In an ideal case where the data is perfectly ranked, (1−NDCG) is equal to zero. Thus, (1−NDCG) may be viewed as a kind of ranking error reflecting the degree to which the data is not perfectly ranked. Since the system desires to rank the data perfectly, it is desirable to minimize this ranking error.

As noted above, the baseline feature representation had a dimensionality of 12,646, the Bayesian feature representation had a dimensionality of 459,462, the single-feature representation had a dimensionality of 12,647, and the threshold-based feature representation had a dimensionality of 12,656. In Table IV, the Bayesian feature representation yields an improvement of 11.77% relative to the baseline. The threshold-based representation and single feature representation yield improvements of 9.71% and 9.46%., respectively While somewhat lower than the gains from using Bayesian feature representation, it was worth noting that the single feature representation and threshold-based representation had approximately ¹⁄₄₀th the 459,462 dimensionality of the Bayesian representation. In other words, the system may balance a tradeoff between ranking performance and the compactness of the representation. The threshold-based features seem to strike a good balance between these two goals by trading a small drop in ranking performance (relative to the Bayesian features) for a large improvement in compactness.

Table IV also shows that the term-dependent weights generally yield better results than both the average weights and the uniform weights. When applied to the single-feature and threshold-based representations, the difference in performance between term-dependent weights and the uniform weights was actually quite large. These results show the significance and the advantages of using the three different parameterizations of (i) a uniform parameterization $\alpha_{p,t}$, (ii) an average parameterization $\alpha_{p,t}$, and (iii) a term-dependent parameterization $\alpha_{p,t}$ as reflected through equations (11)-(13) above, respectively Experiments: Online Evaluation The online experiments served as a follow-up investigation of the above offline experiments. In the online experiments, the system ran the clickable terms model with threshold based features and per-term weights on a portion of live web traffic on yahoo.com. Unlike the previous experiments, where the ads were ranked by probability-of-click and then evaluated in terms of NDCG, the ads in this experiment were ranked according to their expected cost per impression:

$$\text{Expected cost per impression} = b(a) \cdot Pr(c(a)). \quad (1)$$

where
- a represents a particular ad impression, which implicitly may specify not only the ad that was shown, but also the page, the time/date, and any other information associated with the impression,
- b(a) represents an advertiser's bid, which is a maximum cost-per-click of ad impression a,
- c(a) represents a click on ad impression a, and
- Pr(c(a)) represents a click probability of ad impression a.

The actual cost to the advertiser for a clicked ad was computed from:

$$\text{cost}(a_n) = b(a_{n+1}) \cdot \frac{Pr(c(a_{n+1}))}{Pr(c(a_n))} \quad (2)$$

where
- $a_n$ represents ad impression a identified as n ad impression,
- $b(a_{n+1})$ represents an advertiser's bid for the ad impression after n ad impression,
- $c(a_n)$ represents a click on ad impression $a_n$,
- cost $(a_n)$ represents the actual cost for a click on ad $a_n$, and
- $Pr(c(a_n))$ represents a click probability of ad impression $a_n$.

In the online experiment, the system ran both a clickable terms model with threshold-based feature and a clickable terms model per-term weights feature on a portion of live web traffic over a two-week period. Each model recorded between 3,000 and 4,000 clicks per day during this period. The system looked for click-through rate (CTR) and average revenue per impression (RPI), where RPI is equivalent to the average cost per impression to the advertisers of equation (2) above.

Despite of the significant number of daily click events that were recorded, the system found that the relative click-through rate and average revenue per impression gains varied significantly from one day to the next. This day-to-day variability can be attributed to various factors. For example, publishers/advertisers often change the content of their pages or ads every day or every few days. This is particularly true for news sites, where the content changes daily, or even several times per day. Moreover, the overall lick-through rate and average revenue per impression performance on any given day tends to be dominated by a relatively small number of websites that receive a disproportionately large amount of web traffic (called "head" publisher sites). Thus, any day-to-day changes in these sites can have a significant impact on the overall results.

In the online experiment, the click-through gain was 1.5% relative to the baseline click model and the revenue per impression gain was 2.5% relative to the baseline click model. Note that both the relative CTR gain and the relative RPI gain were fairly modest when compared with the relative NDCG gains of approximately 9% to 11% (Table IV) in the offline experiments. One possible explanation for this is that a mismatch existed between the model training data and the online data. The clickable terms model was trained on click data, which only captures click information for ads that actually appeared on a given page. Thus, for every page impression, the system typically only includes "labels" (i.e., click information) for the three or four top-ranked ads from the ad index. The remaining ads were effectively "unlabeled" for that particular page impression. Nonetheless, the model was still responsible for scoring and ranking these ads at runtime. Another possible source of mismatch was that the training data was collected several months prior to the online testing. The webpage and ad data in content matching are constantly in flux. As a result, performance of content matching models often tends to degrade with time, unless the models are regularly updated.

A t-test is a statistical hypothesis test in which the test statistic follows a Student's t distribution if the null hypothesis is true. In a paired t-test, the null hypothesis that the difference between two responses measured on the same statistical unit has a mean value of zero is tested. Paired two-sided t-tests are a form of blocking, and have greater power than unpaired tests when the paired units are similar with respect to "noise factors" that are independent of membership in the two groups being compared.

To evaluate the relevance of the 1.5% click-through gain and the 2.5% revenue per impression gain, the system performed a paired t-test on both the CTR and the RPI results. The system controlled for day-to-day fluctuations in the results by conducting the t-test on the per-day CTR and RPI statistics of the two models. As a result, the system assumed that each model had a total of fourteen independent observations for both CTR and RPI. That is to say, the system applied one observation for every day during the two week testing period. A two-sided paired t-test on this data yielded a p-value of 0.046 for the CTR results and 0.032 for RPI. Both values are below 0.05; thus, the system concluded that the 1.5% CTR and the 2.5% RPI improvements are statistically significant at the 5% level. Thus, while the clickable terms model yielded modest in click through rate (CTR) and revenue per impression (RPI) in tests performed on live web traffic, the clickable terms model achieved significant gains in normalized discounted cumulative gain (NDCG) over a baseline click model that incorporates only lexical match features and yielded significant gains in click through rate and revenue per impression in tests performed on live web traffic.

Figure 5:
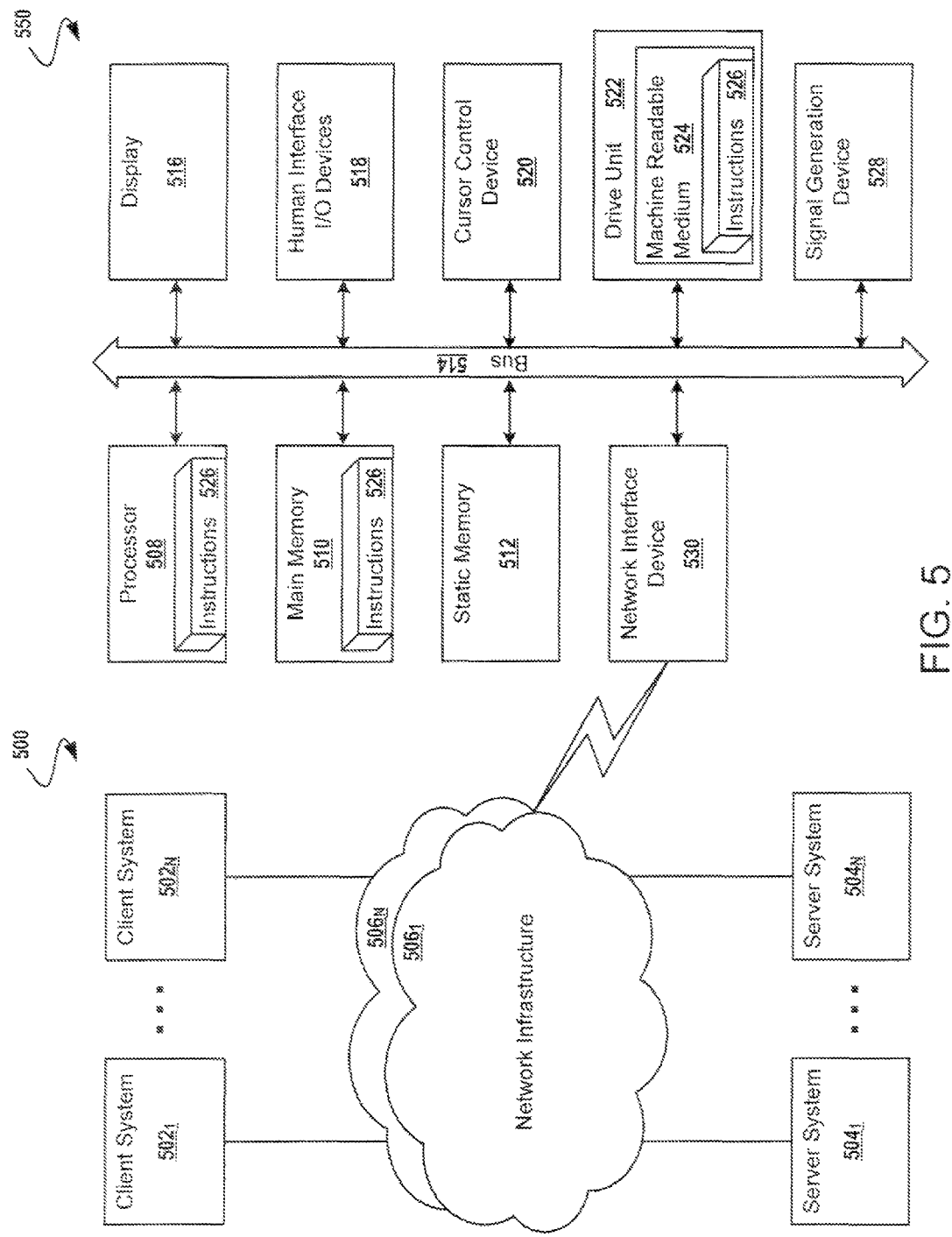
FIG. 5 is a diagrammatic representation of a network 500.

FIG. 5 is a diagrammatic representation of a network 500, including nodes for client computer systems $502_1$ through $502_N$, nodes for server computer systems $504_1$ through $504_N$, nodes for network infrastructure $506_1$ through $506_N$, any of which nodes may comprise a machine 5120 within which a set of instructions for causing the machine to perform any one of the techniques discussed above may be executed. The embodiment shown is purely exemplary, and might be implemented in the context of one or more of the figures herein.

Any node of the network 500 may comprise a general-purpose processor, a digital signal processor (DSP), an application specific integrated circuit (ASIC), a field programmable gate array (FPGA) or other programmable logic device, discrete gate or transistor logic, discrete hardware components, or any combination thereof capable to perform the functions described herein. A general-purpose processor may be a microprocessor, but in the alternative, the processor may be any conventional processor, controller, microcontroller, or state machine. A system also may implement a processor as a combination of computing devices (e.g., a combination of a DSP and a microprocessor, a plurality of microprocessors, one or more microprocessors in conjunction with a DSP core, or any other such configuration, etc).

In alternative embodiments, a node may comprise a machine in the form of a virtual machine (VM), a virtual server, a virtual client, a virtual desktop, a virtual volume, a network router, a network switch, a network bridge, a personal digital assistant (PDA), a cellular telephone, a web appliance, or any machine capable of executing a sequence of instructions that specify actions to be taken by that machine. Any node of the network may communicate cooperatively with another node on the network. In some embodiments, any node of the network may communicate cooperatively with every other node of the network. Further, any node or group of nodes on the network may comprise one or more computer systems (e.g., a client computer system, a server computer system) and/or may comprise one or more embedded computer systems, a massively parallel computer system, and/or a cloud computer system.

The computer system 5120 includes a processor 508 (e.g., a processor core, a microprocessor, a computing device, etc), a main memory 510 and a static memory 512, which communicate with each other via a bus 514. The machine 5120 may further include a display unit 516 that may comprise a touchscreen, or a liquid crystal display (LCD), or a light emitting diode (LED) display, or a cathode ray tube (CRT). As shown, the computer system 5120 also includes a human input/output (I/O) device 518 (e.g., a keyboard, an alphanumeric keypad, etc), a pointing device 520 (e.g., a mouse, a touch screen, etc), a drive unit 522 (e.g., a disk drive unit, a CD/DVD drive, a tangible computer readable removable media drive, an SSD storage device, etc), a signal generation device 528 (e.g., a speaker, an audio output, etc), and a network interface device 530 (e.g., an Ethernet interface, a wired network interface, a wireless network interface, a propagated signal interface, etc).

The drive unit 522 includes a machine-readable medium 524 on which is stored a set of instructions (i.e., software, firmware, middleware, etc) 526 embodying any one, or all, of the methodologies described above. The set of instructions 526 also may reside, completely or at least partially, within the main memory 510 and/or within the processor 508. The network bus 514 of the network interface device 530 may provide a way to further transmit or receive the set of instructions 526.

A computer may include a machine to perform calculations automatically. A computer may include a machine that manipulates data according to a set of instructions. In addition, a computer may include a programmable device that performs mathematical calculations and logical operations, especially one that can process, store and retrieve large amounts of data very quickly.

It is to be understood that embodiments of this invention may be used as, or to support, a set of instructions executed upon some form of processing core (such as the CPU of a computer) or otherwise implemented or realized upon or within a machine- or computer-readable medium. A machine-readable medium includes any mechanism for storing or transmitting information in a form readable by a machine (e.g., a computer). For example, a machine-readable medium includes read-only memory (ROM); random access memory (RAM); magnetic disk storage media; optical storage media; flash memory devices; electrical, optical, acoustical, or any other type of media suitable for storing information.

A computer program product on a storage medium having instructions stored thereon/in may implement part or all of system 200. The system may use these instructions to control, or cause, a computer to perform any of the processes. The storage medium may include without limitation any type of disk including floppy disks, mini disks (MD's), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Storing may involve putting or retaining data in a memory unit such as a storage medium. Retrieving may involve locating and reading data from storage. Delivering may involve carrying and turning over to the intended recipient. For example, information may be stored by putting data representing the information in a memory unit, for example. The system may store information by retaining data representing the information in a memory unit, for example. The system may retrieve the information and deliver the information downstream for processing. The system may retrieve a message such as an advertisement from an advertising exchange system, carried over a network, and turned over to a member of a target-group of members.

Stored on any one of the computer readable medium, system 200 may include software both to control the hardware of a general purpose/specialized computer or microprocessor and to enable the computer or microprocessor to interact with a human consumer or other mechanism utilizing the results of system 200. Such software may include without limitation device drivers, operating systems, and user applications. Ultimately, such computer readable medium further may include software to perform system 200.

Although the system may utilize the techniques in the online advertising context, the techniques also may be applicable in any number of different open exchanges where the open exchange offers products, commodities, or services for purchase or sale. Further, many of the features described herein may help data buyers and others to target users in audience segments more effectively. However, while data in the form of segment identifiers may be generally stored and/or retrieved, examples of the invention preferably do not require any specific personal identifier information (e.g., name or social security number) to operate.

The techniques described herein may be implemented in digital electronic circuitry, or in computer hardware, firmware, software recorded on a computer-readable medium, or in combinations of them. The system may implement the techniques as a computer program product, i.e., a computer program tangibly embodied in an information carrier, including a machine-readable storage device, for execution by, or to control the operation of, data processing apparatus, e.g., a programmable processor, a computer, or multiple computers. Any form of programming language may convey a written computer program, including compiled or interpreted languages. A system may deploy the computer program in any form, including as a stand-alone program or as a module, component, subroutine, or other unit recorded on a computer-readable medium and otherwise suitable for use in a computing environment. A system may deploy a computer program for execution on one computer or on multiple computers at one site or distributed across multiple sites and interconnected by a communication network.

A system may perform the methods described herein in programmable processors executing a computer program to perform functions disclosed herein by operating on input data and generating output. A system also may perform the methods by special purpose logic circuitry and implement apparatus as special purpose logic circuitry special purpose logic circuitry, e.g., an FPGA (field programmable gate array) or an ASIC (application-specific integrated circuit). Modules may refer to portions of the computer program and/or the processor/special circuitry that implements that functionality. An engine may be a continuation-based construct that may provide timed preemption through a clock that may measure real time or time simulated through language like scheme. Engines may refer to portions of the computer program and/or the processor/special circuitry that implements the functionality. A system may record modules, engines, and other purported software elements on a computer-readable medium. For example, a processing engine, a storing engine, a retrieving engine, and a delivering engine each may implement the functionality of its name and may be recorded on a computer-readable medium.

Processors suitable for the execution of a computer program include, by way of example, both general and special purpose microprocessors, and any processors of any kind of digital computer. Generally, a processor may receive instructions and data from a read-only memory or a random access memory or both. Essential elements of a computer may be a processor for executing instructions and memory devices for storing instructions and data. Generally, a computer also includes, or may be operatively coupled to receive data from or transfer data to, or both, mass storage devices for storing data, e.g., magnetic, magneto-optical disks, or optical disks. Information carriers suitable for embodying computer program instructions and data include all forms of non-volatile memory, including by way of example semiconductor memory-devices, e.g., EPROM, EEPROM, and flash memory devices; magnetic disks, e.g., internal hard disks or removable disks; magneto-optical disks; and CD-ROM and DVD-ROM disks. A system may supplement a processor and the memory by special purpose logic circuitry and may incorporate the processor and the memory in special purpose logic circuitry.

To provide for interaction with a user, the techniques described herein may be implemented on a computer having a display device, e.g., a CRT (cathode ray tube) or LCD (liquid crystal display) monitor, for displaying information to the user and a keyboard and a pointing device, e.g., a mouse or a trackball, by which the user provides input to the computer (e.g., interact with a user interface element, for example, by clicking a button on such a pointing device). Other kinds of devices may be used to provide for interaction with a user as well; for example, feedback provided to the user includes any form of sensory feedback, e.g., visual feedback, auditory feedback, or tactile feedback; and input from the user may be received in any form, including acoustic, speech, or tactile input.

The techniques described herein may be implemented in a distributed computing system that includes a back-end component, e.g., as a data server, and/or a middleware component, e.g., an application server, and/or a front-end component, e.g., a client computer having a graphical user interface and/or a Web browser through which a user interacts with an implementation of the invention, or any combination of such back-end, middleware, or front-end components. A system may interconnect the components of the system by any form or medium of digital data communication, e.g., a communication network. Examples of communication networks include a local area network ("LAN") and a wide area network ("WAN"), e.g., the Internet, and include both wired and wireless networks.

The computing system may include clients and servers. A client and server may be generally remote from each other and typically interact over a communication network. The relationship of client and server arises by virtue of computer programs running on the respective computers and having a client-server relationship to each other. One of ordinary skill recognizes any or all of the foregoing implemented and described as computer readable media.

In the above description, numerous details have been set forth for purpose of explanation. However, one of ordinary skill in the art will realize that a skilled person may practice the invention without the use of these specific details. In other instances, the disclosure may present well-known structures and devices in block diagram form to avoid obscuring the description with unnecessary detail. In other words, the details provide the information disclosed herein merely to illustrate principles. A skilled person should not construe this as limiting the scope of the subject matter of the terms of the claims. On the other hand, a skilled person should not read the claims so broadly as to include statutory and nonstatutory subject matter since such a construction is not reasonable. Here, it would be unreasonable for a skilled person to give a scope to the claim that is so broad that it makes the claim non-statutory. Accordingly, a skilled person is to regard the written specification and figures in an illustrative rather than a restrictive sense. Moreover, a skilled person may apply the principles disclosed to achieve the advantages described herein and to achieve other advantages or to satisfy other objectives, as well.

What is claimed is:

1. An online advertising method implemented in one or more computers, each computer comprising at least one processor and memory, to select advertisements for display on a webpage, comprising:
   storing, in a computer, a website identity for a webpage, wherein the website identity comprises one or more terms derived from the uniform resource locators (URLs) of the website;
   storing, in a computer, a set of candidate advertisements;
   estimating, in a computer, a click probability for each candidate advertisement based on the website identity; and
   selecting, in a computer, at least one candidate advertisement for displaying on the webpage based on a highest click probability associated with the candidate advertisement.

2. The online advertising method of claim 1, wherein estimating a click probability comprises estimating the click probability based on the degree to which terms from a candidate advertisement match the website identity.

3. The online advertising method of claim 1, wherein estimating a click probability comprises a click model that is based on a ranking of the set of candidate advertisements and the website identity.

4. The online advertising method of claim 3, wherein the click model employs the equation:

$$Pr(c(a) \mid p, r(a)) = \frac{\exp\left(\sum_i [w_i f_i(p, r(a))]\right)}{\exp\left(\sum_i [w_i f_i(p, r(a))) + 1]\right)},$$

wherein Pr(c(a)|p, r(a)) is the click probability of a click event c(a) on the candidate advertisement a for the website identity p and an advertisement rank r(a), and $$\exp\left(\sum_i [w_i f_i(p, r(a))]\right)$$

is an exponent of a weighted sum $\Sigma_i w_i$ of a set of features $f_i$ that is comprised of the website identity P and the advertisement rank r(a).

5. The online advertising method of claim 4, wherein the click model employs the equation:

$$\sum_i w_i f_i(p, r(a)) = \log \frac{Pr(c(a) \mid p, r(a)))}{Pr(!c(a) \mid p, r(a)))},$$

wherein $\Sigma_i w_i f_i(p, r(a))$ is the weighted sum $\Sigma_i w_i$ of the set of features $f_i$ that is comprised of the webpage identity p and the advertisement rank r(a) of the candidate advertisement a, Pr(c(a)|p, r(a)) is the click probability of a click event c(a) on the candidate advertisement a for the website identity p and an advertisement rank r(a), and Pr(!c(a)|p, r(a)) is the click probability of a lack of a click event !c(a) on the candidate advertisement a for the website identity p and an advertisement rank r(a).

6. The online advertising method of claim 3, wherein the click model is based on the ranking, the website identity, and a set of terms from a candidate advertisement.

7. The online advertising method of claim 6, wherein the click model provides a measure for a term from a candidate advertisement, wherein the measure may be used to estimate whether the term is more or less likely to be clicked upon than a second term.

8. The online advertising method of claim 6, wherein the click model employs the equation:

$$\sum_j w_j^* f_j^*(p, r(a), T(a)) = \sum_i w_i f_i(p, r(a)) + \sum_{T_k \in a} L_{p,k},$$

with $$\mathcal{L}_{p,k} \equiv \log \frac{Pr(T_k(a \mid c(a), p))}{Pr(T_k(a \mid !c(a), p))},$$

wherein $\Sigma_j w_j^* f_j^*(p, r(a), T(a))$ is the weighted sum $\Sigma_j w_j^*$ of set of features $f_j^*$ that is comprised of the website identity p, the advertisement rank r(a), and the set of terms T(a) in the candidate advertisement a, $\Sigma_i w_i f_i(p, r(a))$ is a weighted sum $\Sigma_i w_i$ of a set of features $f_i$ that is comprised of the website identity P and the advertisement rank r(a), and $$\sum_{T_k \in a} L_{p,k}$$

is a sum $$\sum_{T_k \in a} $$

of a log-likelihood ratio $\mathcal{L}_{p,k}$ of a term $T_k$ given the website identity p, $Pr(T_k(a|c(a), p))$ is an event probability value of an event that the term $T_k$ is in the candidate advertisement a given the click event c(a) and the website identity p, and $Pr(T_k(a|!c(a), p))$ is an event probability value of an event that the term $T_k$ is in the candidate advertisement a given the website identity p and a lack of the click event !c(a).

9. The online advertising method of claim 6, wherein the click model defines one separate model weight for every combination of website identity and term from the set of terms.

10. The online advertising method of claim 8, wherein, in the equation, $$\sum_{T_k \in a} L_{p,k}$$

is replaced with $$\sum_k w'_{p,k} f'_{p,k},$$

where $f'_{p,k} \equiv 1(T_k \in a) \forall p, k$, and $w'_{p,k} \sim \mathcal{N}(\mathcal{L}_{p,k}, \sigma) \forall p, k$, and where $w'_{p,k}$ is the kth maximum-entropy click model weight and is Gaussian.

11. The online advertising method of claim 9, wherein the click model employs a term importance weight that reflects the relative importance of a term, and wherein the term importance weight is a function of a total number of unique terms, or a function of an expected number of unique terms that co-occur with a given term in advertisements that appear on a webpage.

12. The online advertising method of claim 7, wherein the click model employs a term importance weight that reflects the importance of the term relative to other terms within the set.

13. The online advertising method of claim 12, wherein the click model employs a term importance weight that reflects the relative importance of a term, and wherein the term importance weight is a function of a total number of unique terms, or a function of an expected number of unique terms that co-occur with a given term in advertisements that appear on a webpage.

14. The online advertising method of claim 8, wherein $$\sum_{T_k \in a} L_{p,k}$$

is replaced with $$\sum_k w'_k f'_k(p, T(a)),$$

where $$f'_k(p, T(a)) \equiv \sum_{T_k \in a} \alpha_{p,k} L_{p,k},$$

and $w_k \sim N(O,\sigma)$, and $\alpha_{p,k}$ represents a term importance weight for the kth term $T_k$ on website identity p.

15. The online advertising method of claim 7, wherein the set of terms from a candidate advertisement is limited to terms whose measure passes a threshold.

16. The online advertising method of claim 15, wherein the click model employs a term importance weight that reflects the relative importance of a term, and wherein the term importance weight is a function of a total number of unique terms, or a function of an expected number of unique terms that co-occur with a given term in advertisements that appear on a webpage.

17. A computer program product stored on a non-transitory computer-readable medium that when executed by a processor enables the processor to select advertisements for display on a webpage, comprising:

first computer program logic means for storing a website identity for a webpage, wherein the website identity comprises one or more terms derived from the URLs of the website;

second computer program logic means for storing a set of candidate advertisements;

third computer program logic means for estimating a click probability for each candidate advertisement based on the website identity; and fourth computer program logic means for selecting at least one candidate advertisement for displaying on the webpage based on a highest click probability associated with the candidate advertisement.

* * * * *